United States Patent
Ross

(10) Patent No.: US 9,756,515 B1
(45) Date of Patent: Sep. 5, 2017

(54) MOBILE DEVICE TEST INFRASTRUCTURE

(71) Applicant: Amazon Technologies, Inc., Seattle, WA (US)

(72) Inventor: Peter George Ross, Olympia, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 14/659,047

(22) Filed: Mar. 16, 2015

(51) Int. Cl.
*H04W 24/08* (2009.01)
*H04W 4/00* (2009.01)
*H04M 1/725* (2006.01)

(52) U.S. Cl.
CPC ......... *H04W 24/08* (2013.01); *H04M 1/7253* (2013.01); *H04M 1/72577* (2013.01); *H04W 4/003* (2013.01)

(58) Field of Classification Search
CPC ..... H04W 24/08; H04W 4/003; H04W 24/06; H04W 16/22; H04W 16/225; H04M 1/7253; H04M 1/72577; H04B 17/21; H04B 17/309
USPC ........................................................ 455/419
See application file for complete search history.

(56) References Cited

U.S. PATENT DOCUMENTS

| | | | | |
|---|---|---|---|---|
| 8,856,748 B1 * | 10/2014 | Larsen | ................ | G06F 11/3668 717/125 |
| 9,195,574 B1 * | 11/2015 | Ryan | ................... | G06F 11/3664 |
| 2008/0106294 A1 * | 5/2008 | Smith | ................ | G01R 31/2889 324/750.16 |
| 2011/0161912 A1 * | 6/2011 | Eteminan | .................. | G06F 8/20 717/101 |
| 2013/0179858 A1 * | 7/2013 | Mecke | ................ | G06F 11/3684 717/106 |
| 2014/0032641 A1 * | 1/2014 | Du | ........................ | H04L 43/065 709/203 |
| 2014/0047417 A1 * | 2/2014 | Kaasila | ............... | G06F 11/3664 717/135 |
| 2014/0095933 A1 * | 4/2014 | Griesinger | .......... | G06F 11/3676 714/32 |
| 2014/0187173 A1 * | 7/2014 | Partee | .................... | H04B 17/00 455/67.12 |

(Continued)

OTHER PUBLICATIONS

U.S. Appl. No. 13/925,139, filed Jun. 24, 2013, Lokendra Singh.
U.S. Appl. No. 14/274,402, filed May 9, 2014, Lockey, et al.

*Primary Examiner* — Hirdepal Singh
(74) *Attorney, Agent, or Firm* — Robert C. Kowert; Meyertons, Hood, Kivlin, Kowert & Goetzel, P.C.

(57) ABSTRACT

A mobile device test module enables a remote client to execute client-developed mobile device applications on a mobile device, via a communication network, to test application performance on the mobile device. The module includes a host compute board which establishes a device communication link, which can include a wireless link, with a mobile device mounted in the module and generates commands to the mobile device based on signals received at the board. The module restricts the host compute board and mobile device to device communication links between each other. The module housing can restrict device communication links with devices external to the module. The module can be installed in a slot of a chassis which can provide structural, power, and communication support to the module. The chassis includes interface clusters which each can support various modules installed in the slots and can support redundant links with an installed module.

20 Claims, 12 Drawing Sheets

(56) References Cited

U.S. PATENT DOCUMENTS

| | | | |
|---|---|---|---|
| 2014/0258970 A1* | 9/2014 | Brown | G06F 8/47 717/103 |
| 2015/0081598 A1* | 3/2015 | Depizzol | G06N 99/005 706/12 |
| 2015/0127986 A1* | 5/2015 | Tahara | G06F 11/263 714/33 |

* cited by examiner

MOBILE DEVICE TEST INFRASTRUCTURE

BACKGROUND

Various organizations often desire to enable user development of applications configured for execution by mobile devices. Mobile devices can include smartphones, electronic readers, computing tablets, and similar processor-based electronic consumer devices. Applications configured for execution by mobile devices, sometimes referred to as mobile device "apps", mobile device applications, mobile device programs of instruction, etc. can be executed by one or more portions of a mobile device to cause the mobile device to perform various functions. Enabling user development of mobile device programs of instruction can encourage creativity and innovation in mobile device function development and expansion by a diverse set of individuals and can, in some cases, result in development of new and successful commercial enterprises.

In some cases, testing of user-developed mobile device programs of instruction on mobile devices may be desired. Such testing, which can include executing some or all of a mobile device program of instruction on a mobile device, monitoring various aspects of the mobile device concurrently with such execution, some combination thereof, etc. can enable verification that user-developed mobile device programs of instruction are at least partially free from program imperfections, commonly referred to as "bugs", which can hinder utilization of the mobile device programs of instruction by users of mobile devices executing the mobile device programs of instruction. Such verification can be important to a user developing mobile device programs of instruction, particularly where the success of a commercial enterprise, user reputation, some combination thereof, etc. can rely upon user-developed mobile device programs of instruction performing as expected in mobile devices.

In some cases, users developing mobile device programs of instruction may desire to test the mobile device programs of instruction on mobile devices which are not in the users' possession. For example, a user may develop a mobile device program of instruction on a desktop computer, where the mobile device program of instruction is configured to be executed by a particular mobile device which comprises an electronic reader device, to cause the electronic reader device to perform a particular function, but the user may not have possession of an electronic reader upon which to test the mobile device program of instruction which the user has developed.

In some cases, users developing mobile device programs of instruction may desire to test the mobile device programs of instruction on a variety of different mobile devices, at least some of which are not in the users' possession, to verify that the mobile device programs of instruction function as expected across a variety of different mobile devices. For example, a user may develop a mobile device program of instruction which is configured to be executed by some or all mobile devices which comprise a smartphone to cause the smartphone to perform a particular function. The user may desire to ensure that the mobile device program of instruction will perform as expected when executed by different devices, but the user may not have possession each and every various type of smartphone on which the mobile device program of instruction is configured to be executed.

Figure 1:
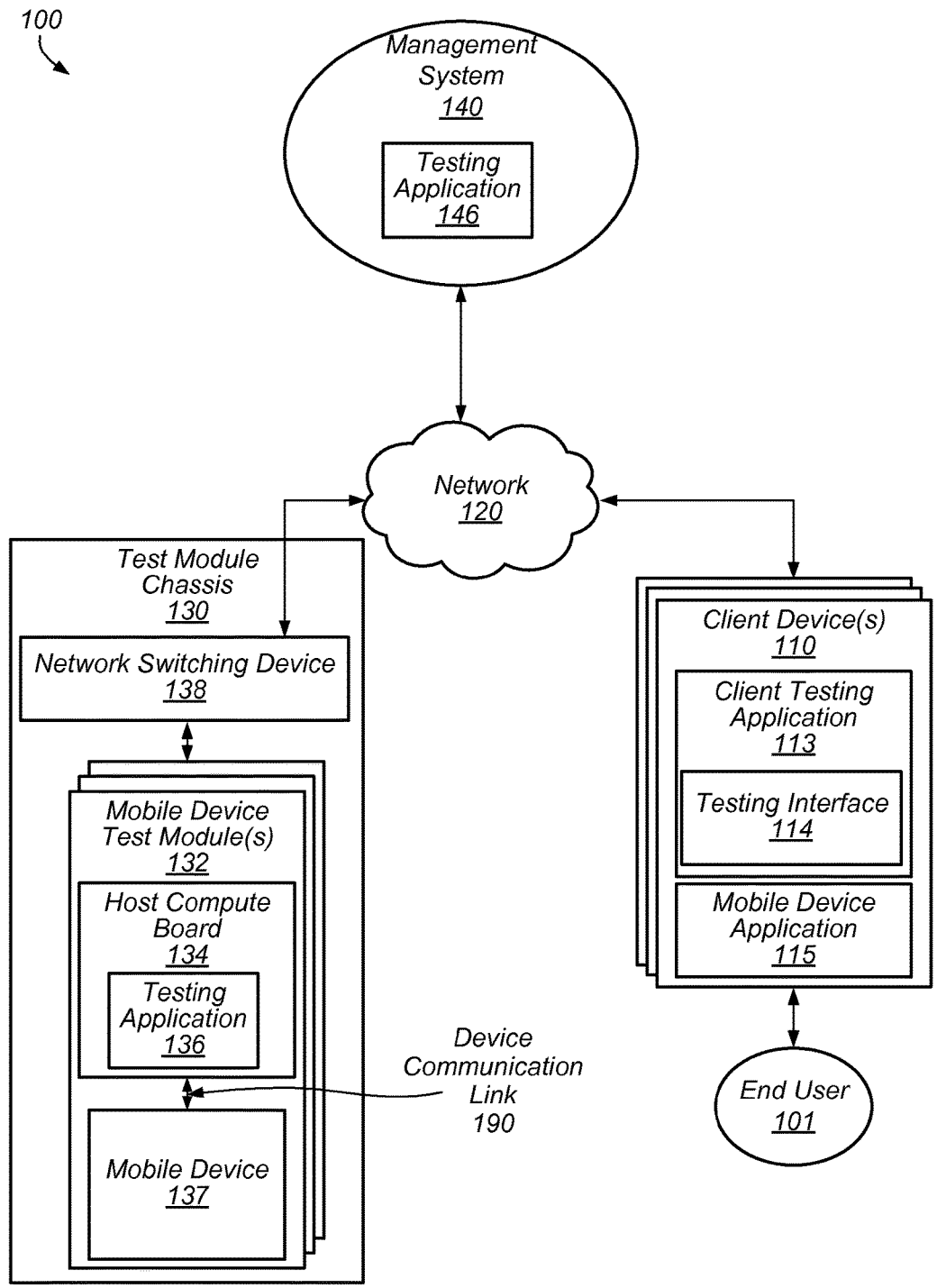
FIG. 1 illustrates a mobile device application test system including mobile test modules which include mobile devices and are communicatively coupled to one or more clients via a communication network, according to some embodiments.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of mobile device test modules, test module chassis, and systems and methods for enabling execution of a mobile device application received from a remotely-located client on an individual mobile device, are disclosed. According to one embodiment, a system includes a mobile device test module installed in a slot of a test module chassis. The mobile device test module includes an instance of processing circuitry, communicatively coupled to a remotely-located user via a communication network, and a mobile device. The mobile device test module enables testing of at least one mobile device program of instruction, received from a remotely-located user via a communication network, on an individual mobile device included in the module via a device communication link established between the at least one instance of processing circuitry and the individual mobile device. The at least one instance of processing circuitry is configured to, based at least in part upon command, received from a remotely-located user via the communication network, receive the mobile device program of instructions from the remotely-located user and generate a command signal which, when communicated to the mobile device via the established device communication link, causes the mobile device to execute the at least one mobile device program of instructions. The test module chassis includes a slot and receives the at least one mobile device test module into the slot to communicatively couple the at least one instance of processing circuitry with the communication network.

According to one embodiment, an apparatus includes a mobile device testing module which enables testing of a mobile device program of instruction, received from a remotely-located user via a communication network, on an individual mobile device included in the module. The mobile device testing module includes a housing, which receives and structurally supports an individual mobile device within an interior of the housing, and an instance of processing circuitry, physically coupled to the interior of the housing and communicatively coupled to the communication network, which establishes a device communication link with the individual mobile device structurally supported within the interior of the housing and commands the mobile device to execute the at least one mobile device program of instructions based at least in part upon commands received from the remotely-located user via the communication network. The mobile device testing module restricts the at least one instance of processing circuitry from establishing additional device communication links with additional individual mobile devices external to the mobile device testing module.

According to one embodiment, a method includes configuring a mobile device testing module to enable testing of an mobile device program of instruction, received from a remotely-located user via a communication network, on an individual mobile device included in the module, wherein the mobile device testing module restricts device communication links with the individual mobile device to a single device communication link with the individual mobile device. Such configuring includes mounting an individual mobile device in an interior of a housing, such that the individual mobile device is structurally supported within the interior of the housing, coupling an instance of processing circuitry to the interior of the housing, wherein the instance of processing circuitry is configured to be communicatively coupled with the communication network, and establishing the device communication link between the instance of processing circuitry and the individual mobile device, such that the instance of processing circuitry is configured to command the mobile device, via the device communication link, to execute the mobile device program of instructions based at least in part upon commands received from the remotely-located user via the communication network.

As used herein, "backplane" means a plate or board to which other electronic components, such as mass storage devices, circuit boards, can be mounted. In some embodiments, mass storage devices, which can include one or more hard disk drives, solid state drives, etc., are plugged into a backplane in a generally perpendicular orientation relative to the face of the backplane. In some embodiments, a backplane includes and one or more power buses that can transmit power to components on the backplane, and one or more data buses that can transmit data to and from components installed on the backplane.

As used herein, a "cable" includes any cable, conduit, or line that carries one or more conductors and that is flexible over at least a portion of its length. A cable may include a connector portion, such as a plug, at one or more of its ends.

As used herein, "circuit board" means any board or plate that has one or more electrical conductors transmitting power, data, or signals from components on or coupled to the circuit board to other components on the board or to external components. In certain embodiments, a circuit board is an epoxy glass board with one or more conductive layers therein. A circuit board may, however, be made of any suitable combination of materials.

As used herein, "chassis" means a structure or element that supports another element or to which other elements can be mounted. A chassis may have any shape or construction, including a frame, a sheet, a plate, a box, a channel, or a combination thereof. In one embodiment, a chassis is made from one or more sheet metal parts. A chassis for a computer system may support circuit board assemblies, power supply units, data storage devices, fans, cables, and other components of the computer system.

As used herein, "computing" includes any operations that can be performed by a computer, such as computation, data storage, data retrieval, or communications.

As used herein, "computer system" includes any of various computer systems or components thereof. One example of a computer system is a rack-mounted server. As used herein, the term computer is not limited to just those integrated circuits referred to in the art as a computer, but broadly refers to a processor, a server, a microcontroller, a microcomputer, a programmable logic controller (PLC), an application specific integrated circuit, and other programmable circuits, and these terms are used interchangeably herein. In the various embodiments, memory may include, but is not limited to, a computer-readable medium, such as a random access memory (RAM). Alternatively, a compact disc-read only memory (CD-ROM), a magneto-optical disk (MOD), and/or a digital versatile disc (DVD) may also be used. Also, additional input channels may include computer peripherals associated with an operator interface such as a mouse and a keyboard. Alternatively, other computer peripherals may also be used that may include, for example, a scanner. Furthermore, in the some embodiments, additional output channels may include an operator interface monitor and/or a printer.

As used herein, "data center" includes any facility or portion of a facility in which computer operations are carried out. A data center may include servers dedicated to specific functions or serving multiple functions. Examples of computer operations include information processing, communications, testing, simulations, power distribution and control, and operational control.

As used herein, to "direct" air includes directing or channeling air, such as to a region or point in space. In various embodiments, air movement for directing air may be induced by creating a high pressure region, a low pressure region, or a combination both. For example, air may be directed downwardly within a chassis by creating a low pressure region at the bottom of the chassis. In some embodiments, air is directed using vanes, panels, plates, baffles, pipes or other structural elements.

As used herein, "member" includes a single element or a combination of two or more elements (for example, a member can include two or more sheet metal parts fastened to one another.

As used herein, a "module" is a component or a combination of components physically coupled to one another. A module may include functional elements and systems, such as computer systems, racks, blowers, ducts, power distribution units, fire suppression systems, and control systems, as well as structural elements, such a frame, housing, structure, container, etc. In some embodiments, a module is prefabricated at a location off-site from a data center.

As used herein, a "rack" means a rack, container, frame, or other element or combination of elements that can contain or physically support one or more electrical systems, such as servers.

As used herein, a "rack unit" or "U" refers to a measure of standard spacing in a rack. One "rack unit", or "U", is nominally 1.75 inches. As used herein, spacing, dimensions, and pitches based on "rack units" or "U" may allow for tolerances, such as manufacturing tolerances.

As used herein, "room" means a room or a space of a structure. A "computer room" means a room in which computer systems, such as rack-mounted servers, are operated.

As used herein, "shelf" means any element or combination of elements on which an object can be rested or mounted. Such elements or combination of elements may be referred to as shelving members or combination of shelving members, respectively. A shelf may include, for example, a plate, a sheet, a tray, a disc, a block, a grid, a box or a set of support rails. A shelf may be rectangular, square, round, or another shape. In some embodiments, a shelf may include one or more rails.

As used herein, a "slot" means a space in a rack into which one or more components can be installed or removed. In some racks, slots are formed between adjacent shelving members, shelf supports or rails of the rack. A slot of a rack may have any orientation, including horizontal, vertical, or angled. A slot may be included in a shelving module mounted in a rack, where the slot is a space in the shelving module into which one or more components can be installed or removed. In some embodiments, a slot has a standard height or width, including 1U, 2U, or 3U under Electronic Industries Association (EIA)-310-D specifications.

As used herein, a "space" means a space, area or volume.

As used herein, "mounting" a particular element on another element refers to positioning the particular element to be in physical contact with the other element, such that the other element provides one or more of structural support, positioning, structural load transfer, stabilization, shock absorption, some combination thereof, or the like with regard to the particular element. The mounted particular element may be positioned to rest upon one or more upper surfaces of the other element, independent of coupling the elements via one or more coupling elements. In some embodiments, mounting the particular element to another element includes coupling the elements such that the other element provides one or more of structural support, positioning, structural load transfer, stabilization, shock absorption, some combination thereof, or the like with regard to the particular element.

As used herein, "installing" a particular element on another element refers to physically coupling the elements such that the particular element is communicatively coupled with at least the other element. Installing the elements can include electrically coupling the elements via physically coupling an electrical connector of the particular element with a complementary electrical connector of the other element. Installing a particular element to another element can include electrically coupling a portion of the particular element to a portion of the other element and mounting another portion of the particular element to another portion of the other element.

As used herein, "shock absorbing", as applied to a supporting element for another element, means that the supporting element absorbs mechanical energy and/or dampens shock and/or vibration loads. A shock-absorbing material may be elastic, viscoelastic, viscous, or combinations thereof.

FIG. 1 illustrates a mobile device application test system including mobile device test modules which include mobile devices and are communicatively coupled to one or more clients via a communication network, according to some embodiments.

The system 100 includes one or more test modules chassis 130 which include on or more module device test modules 132, a mobile device application testing management system 140, and one or more clients 110 in data communication (also referred to as being "communicatively coupled") via a communication network 120 (also referred to as simply a "network"). The network 120 can include the Internet, intranets, extranets, wide area networks (WANs), local area networks (LANs), wired networks, wireless networks, or other suitable networks, one or more combinations thereof, or the like.

The chassis 130 includes one or more mobile device test modules 132, a network switch device 138, and potentially other devices as may be appreciated, including one or more power supply devices.

Each mobile device test module 132 comprises a mobile device 137 and at least one instance of processing circuitry 134 communicatively coupled to the device 137 via a device communication link 190, which can include a wireless communication link. As shown, the at least one instance of processing circuitry can include a host compute board 134.

In some embodiments, the mobile device test module 132 includes one or more interfaces, which can include one or more input/output channels such as, for example, a universal serial bus (USB) connector interface, a power connector interface, and/or any other input/output channel interfaces as may be appreciated. In some embodiments, the module 132 includes a sideband channel interface.

Each mobile device test module 132 includes a mobile device 137 and at least one instance of processing circuitry 134 which is communicatively coupled to the mobile device 137 via a device communication link 190 through which the one or more instances of processing circuitry can interact with one or more portions of the mobile device 137 and can command the mobile device 137 to execute one or more various mobile device applications 115. The at least one instance of processing circuitry can include one or more various instances of processing circuitry and can be at least partially implemented by one or more computer systems. For example, one or more instances of processing circuitry can include a single-board computer system, also referred to interchangeably herein as a system host board, host compute board, etc. In the illustrated embodiment shown in FIG. 1, a mobile device test module 132 includes an instance of processing circuitry which includes a host compute board 134 which is communicatively coupled to the mobile device 137 via a device communication link 190. In some embodiments, the link 190 is a hard line connection between a communication connector interface of an instance of processing circuitry and a communication connector interface the device 137 via one or more instances of communication cabling. In some embodiments, an instance of processing circuitry comprises a wireless communication interface, including a wireless transceiver which can establish a device communication link 190 which is a wireless communication link between the instance of processing circuitry and the mobile device 137. It will be understood that the device communication link 190 can include one or more various communication links via one or more various interfaces, protocols, etc. For example, the link 190 can comprise a USB cable link, a wireless communication link, some combination thereof, etc. Various network protocols which can be utilized in a device communication link 190 will be understood to encompass network protocols that are known in the relevant art, including Bluetooth protocols, Internet protocol suite protocols, System Network Architecture protocols, File Transfer Protocols, Routing protocols, IEEE 802.11 protocols, IEEE 1394 protocols, IEEE 488 protocols, USB protocols, etc.

It will be understood that a mobile device test module can include multiple instances of processing circuitry, including one or more of an interface board, host compute board, etc.

As shown, in some embodiments an instance of processing circuitry 134 can store one or more programs of instruction 136, also referred to herein as "applications", which can be executed by the instance of processing circuitry, loaded onto another device which is commanded by the instance of processing circuitry to execute the application, etc. The applications can include testing applications 136 which can be executed to cause test data, monitoring data, etc. to be generated regarding one or more aspects of a mobile device executing one or more particular mobile device applications. For example, in some embodiments, an instance of processing circuitry 134 executes a testing application to cause the instance of processing circuitry 134 to interact with a mobile device 137 which is executing a mobile device application 115 so that the instance of processing circuitry 134 can monitor one or more aspects of the mobile device 137, including device operating performance, temperature, generated output signals, error logs, etc. concurrently with the execution and generate a test report regarding the results of such monitoring. In some embodiments, the instance of processing circuitry 134 can load the testing application on to a memory of the mobile device 137 via a device communication link 190 and command the mobile device 137 to execute the testing application 136, such that the mobile device 137 is caused to monitor one or more aspects of the mobile device 137, generate one or more test reports which can be transmitted back to the instance of processing circuitry 134, etc.

As shown, an instance of processing circuitry 134 included in a mobile device test module is communicatively coupled to an individual mobile device 137 included in the same module 132, via one or more device communication links 190. In some embodiments, the module is configured to include an instance 134 which is restricted to establishing device communication links 190 with the individual mobile device 137 in the same module, thereby mitigating a risk that commands, applications, etc. intended to be executed by the instance 134 on a particular mobile device 137 in a particular module 132 allocated to a particular remote client 110 are not inadvertently or advertently executed on a different mobile device 137, in a different module 132 allocated to a different client 110. In addition, the module 132 can be configured to restrict the mobile device 137 from establishing a device communication 190 with any other device other than the instance of processing circuitry 134 included in the same module 132 as the device 137. Restricting device communication links between instance of processing circuitry, mobile devices, some combination thereof, etc. in separate modules 132 can at least partially mitigate errors in enabling various clients 110 to test various mobile device applications 115 on various mobile devices 137 by reducing the potential for interference by one instance of processing circuitry, mobile device, etc. in one module on a testing of a mobile device application on a different mobile device in a different module.

To enable such restrictions on device communication links between mobile devices, instances of processing circuitry, etc. in separate modules 132, a mobile device test module 132 can include a housing, where the mobile devices 137, instances of processing circuitry 134, etc. included in the module are installed within an interior of the housing, and where the housing is at least partially comprised of a material which at least partially restricts, inhibits, etc. radio frequency (RF) electromagnetic radiation from passing through the housing material. As a result, where a module 132 includes an instance of processing circuitry 134 configured to establish wireless device communication links 190, the housing of the module 132 can at least partially restrict the instance of processing circuitry 134 to establishing device communication links with devices, including mobile devices 137, included in the same housing interior.

In addition, in order to restrict device communications links to be between an instance of processing circuitry and an individual mobile device, thereby mitigating a risk of interference on a given test of a mobile device application, each module 132 can be restricted to support an individual mobile device within a housing of the module. For example, the module 132 can include a single instance of power connector interfaces to which a mobile device 137 can be coupled; an instance of processing circuitry 134 can be restricted to establishing a single device communication link 190, some combination thereof, etc.

The network switch device 138 can communicatively couple one or more of the mobile device test modules 132 and at least one client 110, the management system 140, etc. via communication network 120. As shown, the network switch device 138 can be mounted in a common chassis with the one or more modules 132 to which the device 138 is coupled. The network switch device 138 can contain multiple Ethernet interfaces, where each mobile device test module 132 may include an Ethernet connector interface that may be connected to the network switch device via an Ethernet cable. In some embodiments, the network switch device 138 is absent, and each module 132 can be coupled with the network 120 without the use of a network switch device 138 external to the module 132. For example, a network communications interface, such as a network communication adapter device, may be included in at least one instance of processing circuitry included in a module 132 and the module 132 may be communicatively coupled to network 120 via such an interface. In addition, in certain embodiments, a module 132 can communicatively couple with one or more systems via a wireless network connection.

The management system 140 may comprise one or more computer systems. Such computer systems may be located in a single installation, distributed among multiple different geographical locations, some combination thereof, or the like. Each computer system in the system 140 can be communicatively coupled to network 120 via one or more interfaces (not shown).

In some embodiments, the system 140 provides remote user access, via one or more networks 120, to one or more of the modules 132. In addition, the system 140 may be used to determine which modules 132 are available for executing certain mobile device applications, allocate certain available modules 132 to access by certain users, track and manage client access sessions, load various programs of instruction, including one or more testing applications 146, in a memory corresponding to one or more of the modules 132, store results of tests of mobile device application executions on a mobile device 137, etc. For example, the system 140 may communicate with each of the modules 132 via the network switch device 138 to determine module 132 availability for remote access, to instruct at least one instance of processing circuitry included in one or more particular modules 132 to interact with particular clients 110, etc.

Clients 110 are representative of one or more client devices that may be coupled to the network 120 and support one or more end-users (referred to interchangeably herein as "users") 101 and access by same to various components over network 120. A client 110 can comprise, for example, a computer system supporting one or more end users 101. Such a computer system may be embodied in the form of a desktop computer, a laptop computer, personal digital assistants, cellular telephones, smartphones, or other devices with like capability. The client 110 can include a display interface. The display interface can comprise, for example, one or more devices such as liquid crystal display (LCD) displays, gas plasma-based flat panel displays, organic light emitting diode (OLED) displays, LCD projectors, or other types of display devices, etc.

The client 110, in some embodiments, can execute various programs of instructions including a client testing application 113. The client testing application 113 may be executed in a client 110, for example, to test one or more mobile device applications 115 developed by the end user. As shown, the application 115 is stored locally at a client device 110. It will be understood that, in some embodiments, the application 115 is stored remotely from the client 110, including in a computer system providing a cloud computing service, including one or more web computing services, etc. where a user can interact with the service, via client 110 and network 120, to develop and modify one or more applications 115. The client testing application 113 may provide a user interface 114 on a display of the client 110 to enable a user 101 to interact with, and at least partially control, a testing of one or more applications 115.

In some embodiments, a user 101 can interact with system 100 to test a mobile device application 115 on one or more mobile devices 137, which can enable the user 101 to verify that the mobile device application is configured to cause the one or more mobile devices 137 to operate as intended when executing the application 115. Such testing can be utilized by a user 101 who is an application developer to verify the performance of an application 115, developed by the user 101 for execution on one or more various mobile devices, on one or more various mobile device 137. The system 100 can enable the user 101 to test the mobile device application 115 on one or more mobile devices 137 which are not in the user's possession 101. Furthermore, the system 100 can provide test data, via execution of one or more testing applications 136, 146, to which the user 101 may not otherwise have access. Such a system 100 can therefore facilitate the development and marketing of mobile device applications which are verified as operating on a wide range of mobile devices, which can, as a result, mitigate damage to user devices supporting other users who subsequently load the application 115 on the user devices, thereby mitigating inconvenience to the users.

As shown, system 100 is configured to provide a testing service to multiple clients 110 supporting multiple users, where the system 100 can enable separate clients 110 to access separate test modules 132 to test separate mobile device applications 115 on separate mobile devices 137. Separate modules 132 can include similar mobile devices 137, different mobile devices 137, etc. For example, a particular module 132 can include a particular type of smartphone device, another module 132 can include a tablet computer, etc. Each instance 134 in each module can determine the particular device 137 to which it is linked, via link 190, and communicate information identifying the device 137 to system 140, which can then associate the module 132 in which the instance 134 is located with the particular type of mobile device 137 identified. A client 110 can access a mobile device application testing service provided by system, via application 113 communicating with system 140 via network 120, to request testing of a particular mobile device application 115 on one or more particular types of mobile devices 137. The system 140 can identify particular modules 132 which are available for testing and which are associated with the particular types of mobile devices and can enable a remote access session by the client with the one or more particular modules 132. A remote access session can include a communication link between a client 110 and an instance of processing circuitry 134 included in a particular module 132. The client may be precluded from directly interacting with the mobile device 137 in the module; the instance of processing circuitry 134 may process commands received from one or more of the client 110, system 140, etc. and can generate commands to the mobile device 137 over link 190 based on commands received over network 120 from one or more of system 140 and client 110. For example, system 140 can provide one or more particular testing applications 146 to be utilized by the instance 134 during a particular remote access session, client 110 can provide a particular mobile device application 115 to be tested on a mobile device during the remote access session, the client 110 can provide information specifying particular actions to be taken during the test, including execution of the mobile device application 115 on the mobile device 137, performance of one or more tests by one or more of instance 134 or device 137 concurrently with the execution, etc. In some embodiments, commands, data, etc. received from a client 110 include commands, data, etc. received from a separate computer system based on client commands. For example, where a mobile device application 115 is stored on a remote computer system which is accessed by client 110, and where the client initiates a remote access session with a module 132, the client 110 can command the remote computer system to send the application 115 to an instance of processing circuitry 134 on the module 132 via network 120.

In some embodiments, system 140 tracks remote access sessions by one or more clients 110 with one or more modules. System 140 can restrict access sessions by a client 110 with a module 132 to a particular duration, to a particular quantity of interactions between the client 110 and module 132, including a particular limited quantity of applications 115 that the client 110 can command the instance 134 included in the 132 to test on mobile device 137, etc.

The at least one instance of processing circuitry 134 included in a mobile device test module 132 can indicate availability of the module 132 for a remote access session with a remote user over a communication network. The indication can be transmitted to a management system 140 that manages remote access sessions with one or more modules 132 by remote client devices 110 supporting the remote users 101. Availability can be indicated based at least in part upon a determination, by one or more portions of the at least one instance of processing circuitry 134, that the mobile device 137 to which the at least one instance is linked via a device communication link 190 in the module 132 are in a particular state, including a default state in which changes to a memory included in the set of component, caused by previous access sessions, is deleted and the mobile device 137 is restored to a default state. In some embodiments, the indication is processed by the management system 140 to determine that the module 132 is available for a remote access session, and the management system 140 assigns the module 132 to a remote access queue.

In some embodiments, the at least one instance of processing circuitry 134 receives an indication that the mobile device test module 132 is allocated to a remote user 101 for a remote access session with the remote user 101. The indication can include an initial communication with the at least one instance of processing circuitry 134 by the client 110 supporting the remote user 101, a signal from the management system 140 identifying the remote user 101, client 110, some combination thereof, etc. and indicating that the mobile device test module 132 is allocated to a remote access session with the remote user 101, etc.

In some embodiments, the at least one instance of processing circuitry 134 generates one or more output signals that can be communicated to the client 110 supporting the remote user 101, via a communication network 120, to present a mobile device application testing interface 114 to the user via a client device display. The user can interact with the presented interface to provide commands to the at least one instance of processing circuitry 134 over the communication network 120. Such commands can include providing a mobile device application 115 to the at least one instance of processing circuitry 134, commanding the at least one instance of processing circuitry 134 to execute a mobile device application 115 on the mobile device 137 to which the at least one instance of processing circuitry is linked via a device communication link 190, a command to monitor one or more aspects of the mobile device 137 concurrently with execution of one or more mobile device applications 115, some combination thereof, etc.

In some embodiments, one or more user commands to execute a mobile device application 115 are received at the at least one instance of processing circuitry 134 from a client device 110 supporting a remote user 101 over one or more communication networks 120. The user commands can be received based at least in part upon the remote user 101 interacting with a mobile device testing user interface 114 presented on a display of a client device 110 supporting the remote user 101. Such commands can be communicated to the at least one instance of processing circuitry 134 over the communication network 120. The commands can be receive concurrently with, separately from, some combination thereof, etc. receiving one or more mobile device applications 115 from a device 110 supporting the remote user 101. The one or more mobile device applications 115 can be received from a client device 110 supporting the user 101, a separate device with which the client device 110 is communicatively coupled via a communication network 120, some combination thereof, etc.

In some embodiments, the mobile device application 115 is executed on the mobile device 137. The mobile device application 115 can include one or more mobile device programs of instruction. For example, a mobile device application can include accessing an email application, browsing the internet, initializing a word processor program, initiating a wireless network connection via a mobile device wireless interface, etc. Executing a mobile device application can include generating one or more output signals at the mobile device 137.

In some embodiments, the at least one instance of processing circuitry 134 monitors the execution of the mobile device application 115 on the mobile device 137. Such monitoring can include executing one or more testing applications 136, 146, which can be executed on the mobile device 137 concurrently with the mobile device 137 executing the mobile device application 115. A testing application 136, 146 can generate output data regarding one or more aspects of the mobile device 137, including processor speed, an error log, device component temperature, etc. The output data can be received at the instance 134 via link 190.

In some embodiments, the monitoring can include the one or more instances of processor circuitry 134 controlling one or more mobile device testing interfaces, which can include one or more actuators, camera devices, etc. to interact with, observe, etc. one or more portions of the mobile device concurrently with execution of the mobile device application. For example, where the mobile device test module 132 includes a testing interface which includes a camera device which is oriented to capture images of a display screen of the mobile device, the execution of a mobile device application 115 on a mobile device 132 can include the one or more instances of processing circuitry 134 controlling the camera device to capture images of the display screen concurrently with execution of the mobile device application 115 on the mobile device 137 to monitor the display screen output of the device. In another example, where the mobile device test module 132 includes a testing interface which includes a microactuator device which can interact with one or more interfaces of the device 137, including one or more buttons, touchscreen interfaces, etc. the one or more instances of processing circuitry 134 can control the microactuator to interact with one or more interfaces of the mobile device 137 and can monitor, via one or more device communication links 190, a camera device included in the module 132, some combination thereof, etc., a response of the mobile device to the interaction. In another example, where the mobile device test module 132 includes a testing interface which includes a positional adjustment assembly which can adjust an orientation, position, etc. of the mobile device 137 within the housing interior of the module 132, the one or more instances of processing circuitry 134 can control the positional adjustment assembly to adjust the orientation, position, etc. of the mobile device 137 within the housing interior of the module 132 concurrently with execution of the mobile device application 115 and can monitor, via one or more device communication links 190, a camera device included in the module, some combination thereof, a response of the mobile device 137 to the adjusting, etc.

In some embodiments, the monitoring can include the at least one instance of processing circuitry 134 communicating with one or more portions of the mobile device 137, via a device communication link 190 which includes a sideband communication link, to monitor one or more operational parameters of the mobile device 137, based at least in part upon communicating with one or more portions of the mobile device 137 via the established sideband communication link. The one or more operational parameters of the mobile device can include one or more of temperature data, processor speed data, etc. generated by one or more components of the mobile device concurrently with the execution of the mobile device application 115. In some embodiments, the monitoring includes the at least one instance of processing circuitry 134 generating one or more testing reports which details results of monitoring one or more aspects of the mobile device 137 concurrently with execution of the mobile device application 115 on the mobile device 137.

In some embodiments, a determination is made at the instance 134 regarding whether the remote access session is ended. Such a determination may be determined based at least in part upon a network connection between the at least one instance of processing circuitry 134 and the client device 110 supporting the remote user being terminated, a termination signal being received from the management system 140, etc. If not, the at least one instance of processing circuitry 134 can continue to receive signals from the client device 110 supporting the remote user 101 and execute mobile device applications 115. If so, the at least one instance of processing circuitry 134 can configure the mobile device 137 to a certain predetermined state corresponding with availability for another remote access session. Such configuring can include erasing locally stored data, at one or more portions of the mobile device 137, the at least one instance of processing circuitry 134, etc. associated with the ended access session.

Figure 2:
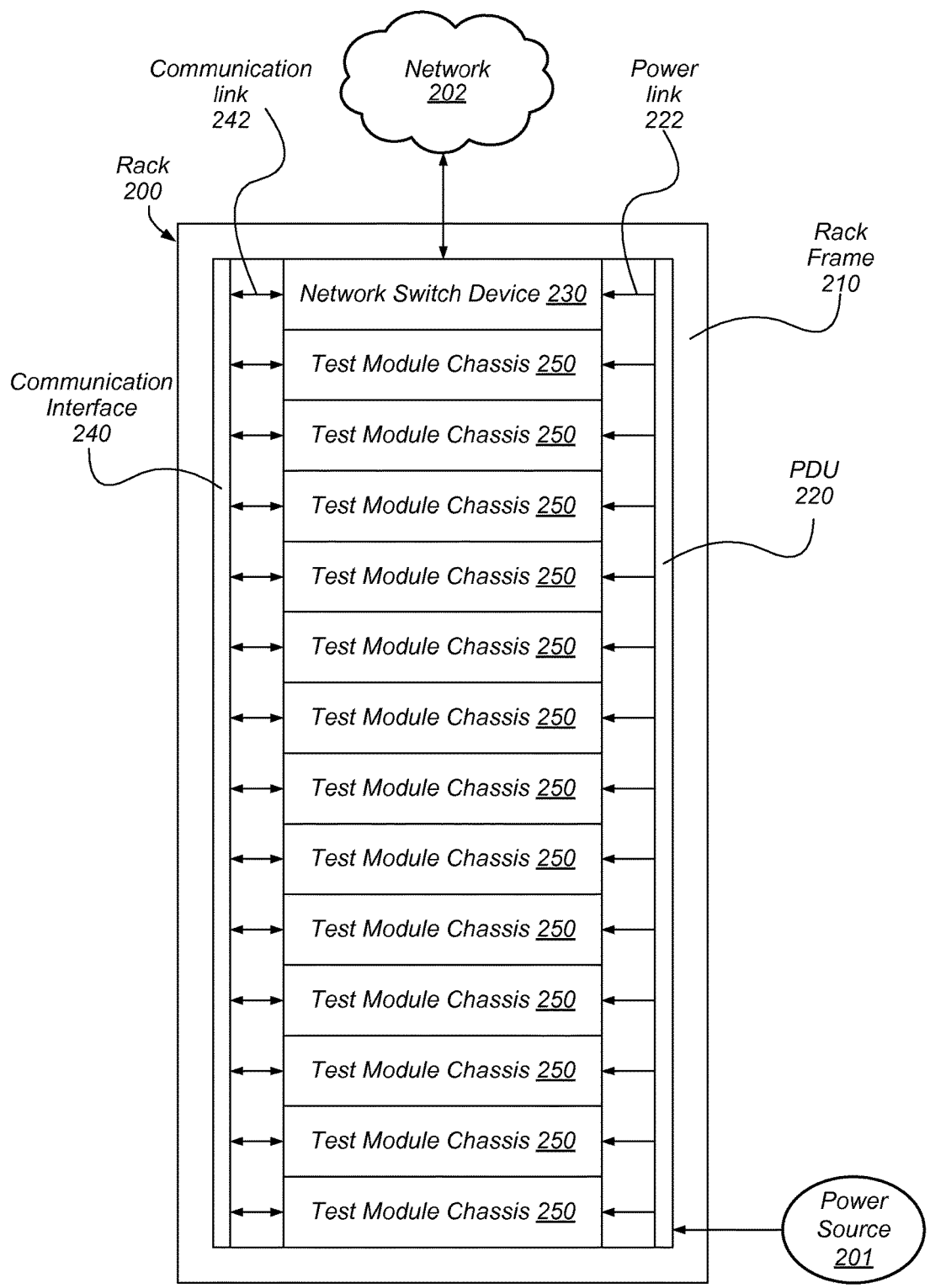
FIG. 2 is a schematic diagram that illustrates a rack configured to support multiple test module chassis in which mobile device test modules are installed, according to some embodiments.

FIG. 2 is a schematic diagram that illustrates a rack configured to support multiple test module chassis in which mobile device test modules are installed, according to some embodiments. The chassis, devices etc. illustrated in FIG. 2 can include the chassis and devices illustrated and discussed with reference to at least FIG. 1.

In some embodiments, one or more test module chassis, in which mobile device test modules can be included, are installed in a rack, which can be similar in size, shape, and construction to a rack in which rack computer systems can be mounted, where each chassis can be structurally supported, and coupled to electrical power and communication support, in the rack.

As shown in FIG. 2, a rack 200 includes a frame 210, a power distribution unit 220, a communication interface 240, a network switch device 230, and a set of test module chassis 250. The network switch device 230 is communicatively coupled to a communication network 202 and can be different from the network switch device 138 shown in FIG. 1, and each separate test module chassis 250 can include a separate network switch device similar to the network switch device 138 shown in FIG. 1, so that the network switch devices of the multiple test modules chassis 250 can be communicatively coupled, via network switch device 230, to a communication network 202.

As shown, the network switch device 230 and test module chassis 250 are installed in a vertical configuration in the rack 200, where each device 230 and chassis 250 is structurally supported, by one or more structural members comprising the rack frame 210, in separate rack positions which have different, mutually exclusive elevations in the rack. In some embodiments, multiple network switch devices 230 are included in the rack 200 and can be communicatively coupled to similar or different test module chassis 250. In some embodiments, multiple chassis 250 can be installed at rack positions which have a common elevation within the rack frame 210. In some embodiments, the rack frame includes shelf structural members upon which one or more chassis 250 can rest, such that the chassis 250 are structurally supported by the one or more shelf structural members. In some embodiments, a rack frame 210 includes a set of rails, extending alone opposite side ends of a rack position, to which a given chassis 250 can be coupled so that the rack frame 210 structurally supports the chassis 250 in the rack position based at least in part upon the rails.

As shown, the rack 200 includes a power distribution unit 220 which is electrically coupled to one or more power sources 201 and is electrically coupled to each of the devices 230 and chassis 250 installed in the rack 200, via separate power links 222. In some embodiments, the chassis 250 and devices 230 are electrically coupled in parallel to one or more power sources 201 via one or more power distribution units (PDUs) 220 included in the rack 200.

As shown, the rack 200 includes a communication interface 240 via which one or more communication interfaces of the test module chassis 250 are communicatively coupled to the network switch device 230. Where each chassis 250 includes a separate network switch device, the communication interface 240 communicatively couples the network switch devices of the various chassis 250 included in the rack 200 with the network switch device 230. The communication interface 240 can include one or more instances of communication conduits, including one or more backplanes which include separate communication connector interfaces which are aligned with separate rack positions in which separate network switch devices 230 and test module chassis 250 are installed. Each installed test module chassis 250 can be coupled to the backplane comprising the interface 240 via a separate communication link 242, which can include one or more communication connector interfaces, one or more communication conduits, etc.

Figure 3:
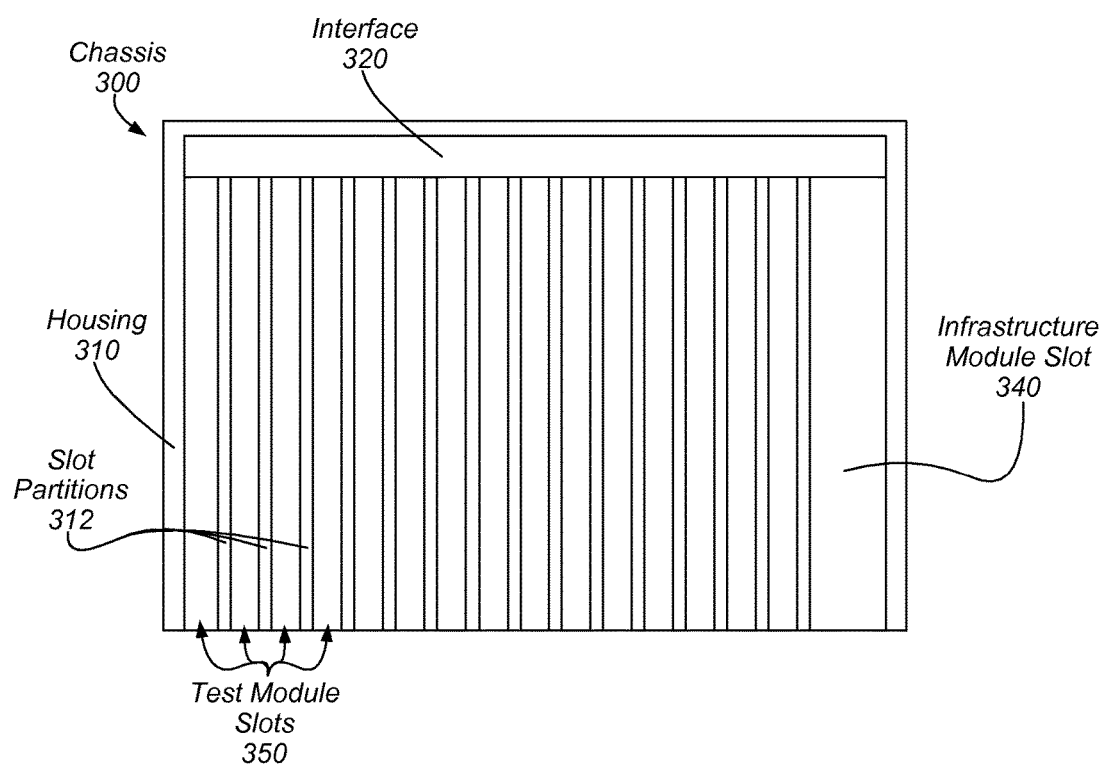
FIG. 3 is a schematic diagram that illustrates an overhead view of a test module chassis which include slots configured to receive and support mobile device test modules and infrastructure modules, according to some embodiments.

FIG. 3 is a schematic diagram that illustrates an overhead view of a test module chassis which include slots configured to receive and support mobile device test modules and infrastructure modules, according to some embodiments. The chassis, devices etc. illustrated in FIG. 3 can include the chassis and devices illustrated and discussed with reference to at least FIG. 1-2.

In some embodiments, a chassis includes multiple slots in which multiple mobile device test modules can be mounted and coupled to communication and power support. As shown, chassis 300 includes a housing 310 which comprises multiple mobile device test module slots 350, at least one infrastructure module 340 configured to support one or more instances of power supplies, network switch devices, etc., and an interface 320 which can couple mobile device test modules installed in slots 350 to the one or more instances of power supplies, network switch devices, etc. installed in slot 340.

In some embodiments, a chassis housing is established based on coupling various structural members to establish at least a partial enclosure. In the illustrated embodiment, for example, housing 310 can be established based on coupling various structural members to establish an enclosure with side ends, a top end, and a bottom end. The housing 310 can provide structural support, stabilization, and at least some protection from external forces to various devices received into the enclosure.

In some embodiments, a chassis includes various slots into which components can be installed, so that the components are structurally supported and communicatively coupled to one or more systems, services, etc. that are external to the chassis ("external services, systems, etc."). A slot can include a portion of the chassis enclosure that is partitioned via various divider structural members (hereinafter "partitions"). The slot can be sized, based on the positions of various dividers in the chassis enclosure, to support certain devices having certain structural dimensions. In the illustrated embodiment, for example, chassis 300 includes various slots 340, 350 that are established in a chassis enclosure by portions of the housing 310 and various partitions 312 installed in the enclosure. A mobile device test module can be inserted into a slot 350, where the housing 310 and partitions 312 cooperate to provide at least structural support and stability to the module in the chassis enclosure. A module can be inserted into a slot 350 via sliding the module into the slot 350 via an open end of the slot, shown in the illustrated embodiment as the end of the chassis 300 at the bottom end of the illustration which is not encompassed by housing 310. Various structural members establishing the slot 350, including adjacent partitions 312 and housing 310 members, can guide the module into the slot 350.

In some embodiments, slots in a chassis can be sized differently to accommodate different types of devices. For example, in the illustrated embodiment, slots 350 may be sized to accommodate particular mobile device test modules, as discussed further below, and slot 340 may be sized to accommodate one or more infrastructure modules, including one or more power supply devices, network switch devices, some combination thereof, etc., which may occupy a greater amount of volume than a mobile device test module. The sizing of the slot may be implemented through coupling the various partitions 312 at different locations in the enclosure of the housing 310 to establish different widths, depths, heights, etc. of various slots in the chassis enclosure. In some embodiments, chassis 300 includes horizontal partitions (not shown) which can couple to one or more housing 310 members, partitions 312, etc. to establish one or more slots having a height less than the enclosure at least partially enclosed by the housing 310.

Figure 4:
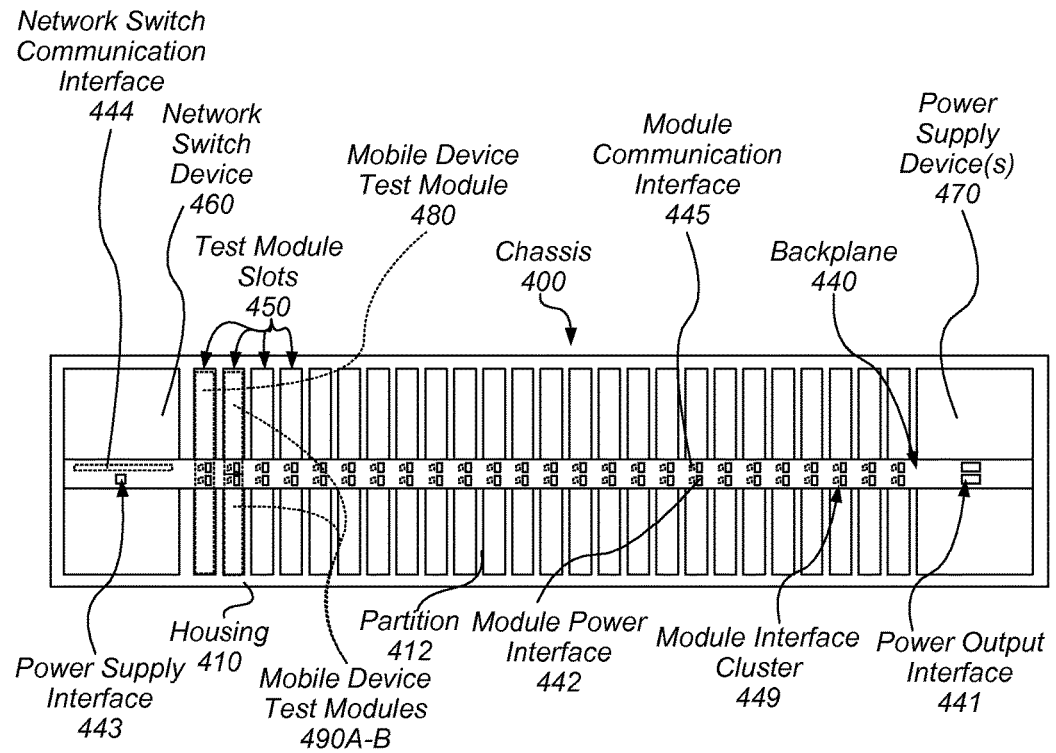
FIG. 4 is a schematic diagram that illustrates an orthogonal view of a test module chassis which include slots configured to receive and support mobile device test modules, according to some embodiments.

FIG. 4 is a schematic diagram that illustrates an orthogonal view of a test module chassis which include slots configured to receive and support mobile device test modules, according to some embodiments. The chassis, devices etc. illustrated in FIG. 4 can include the chassis and devices illustrated and discussed with reference to at least FIG. 1-3.

In some embodiments, a test module chassis includes multiple vertically-oriented slots, where the shortest dimension of each slot is the horizontal dimension. The vertically-oriented slots can be arranged in various rows and column configurations in the chassis and can support one or more mobile device test modules having various heights, so that each slot can support one or more modules which collectively occupy a volume corresponding to the volume of the slot.

As shown in FIG. 4, chassis 400 includes a housing 410 and partitions 412 which collectively establish a set of mobile device test module slots 450 which are each configured to support at least one mobile device test module. The housing 410 and at least some partitions further establish portions of the enclosure of the housing in which infrastructure modules, including one or more network switch devices 460 and one or more power supply devices 470, can be installed. The network switch device 460 and power supply devices 470 can be coupled to mobile device test modules installed in slots 450 so that the network switch device 460 communicatively couples the modules to a communication network, thereby providing communication support to the modules, and the power supply device 470 provides electrical power support to the modules.

In some embodiments, a chassis includes one or more intermediary devices that enable various devices installed in one or more chassis slots to be communicatively coupled to one or more external services, systems, etc. Such external services, systems, etc. can include one or more communication networks, one or more power distribution systems, etc.

In some embodiments, a device that is received into a slot can be coupled with an intermediary device that includes a backplane circuit board assembly ("backplane") via coupling with one or more connector interfaces included in the backplane. Where the backplane is communicatively coupled to an external service, system, etc., coupling the device with the backplane connector can communicatively couple the device with the external service, system, etc. In the illustrated embodiment, chassis 400 includes a backplane 440 includes multiple module interface clusters which are each configured to align with a separate slot 450 in the chassis, and where each interface cluster 449 includes one or more communication connector interfaces 445 and power connector interfaces 442, so that a device, including a mobile device test module, that is inserted into and supported in the one or more particular slots 450 can be coupled to the connector interfaces 442, 445 in the cluster 449 aligned with the one or more particular slots to communicatively couple the device to the external system, service, etc. via the backplane 440. Where a device is inserted, received, etc. into a slot so that the device is supported by structural members establishing the slot and is communicatively coupled to one or more external systems, services, etc. via coupling with one or more connector interfaces that correspond to the slot, the device may be understood to be "installed" in the slot. Installing a device in a slot can include sliding the device into one end of the slot, where a connector interface on the device couples with a backplane connector interface on another end of the slot as the device is inserted into the slot and structural members establishing the slot 450 transmit at least some of the structural load of the device through the chassis. The interfaces 442, 445, in some embodiments, are blind mate connectors configured to couple with corresponding blind mate connectors in one or more mobile device test modules mounted in one or more of the slots 450.

As shown, backplane 440 includes power output interfaces 441 which can couple with power supply devices 470, so that the backplane can provide power support to devices coupled to interfaces 443, 442. The backplane 440 further includes the network switch communication interface, so that the backplane can communicatively couple devices coupled to interfaces 445 with the network switch device 460.

As shown, the backplane 440, and connector interface clusters 449 included thereon, can be configured to link multiple mobile device test modules mounted in a common slot to power and communication support. As shown, each cluster 449 includes a symmetrical arrangement of power connector interfaces 442 and communication connector interfaces 445 in an "over-under" configuration so that at least two mobile device test modules 490A-B, installed in a single slot 450 in an "over-under" mirrored configuration, can each couple with separate interfaces 442, 445 in the cluster 449 aligned with the single slot 450. The same slot 450 and corresponding interface cluster 449 can support a larger single module 480, where the larger module can couple with some or all of the interfaces 442, 445 in the cluster 449. As a result, the slot 450 can support one or more various modules of various shapes and sizes. For example, where module 480 includes a tablet mobile device, the module may be larger, such that the module 480 encompasses an entirety of the available space in a slot 450, while modules 490A-B can each include smartphone mobile devices, thereby being smaller, such that two modules 490A-B encompass a similar amount of space as a single module 480, so that two modules 490 can be installed in a single slot which could otherwise support a single module 480. The modules 480, 490A-B can be reversibly installed and swapped as desired. In some embodiments, a module 480 is configured to couple to multiple interfaces of a common type in an interface cluster 449, so that the module establishes redundant links with one or more of communication support, power support, etc. For example, in the illustrated embodiment, module 480 can couple with each of the communication connector interfaces 445 and each of the power connector interfaces 442 in the closure 449 of the slot in which module 480 is installed, so that the module 480 is linked to the network switch device 460 via redundant communication links and is further linked to the power supply devices 470 via redundant power links.

Figure 5:
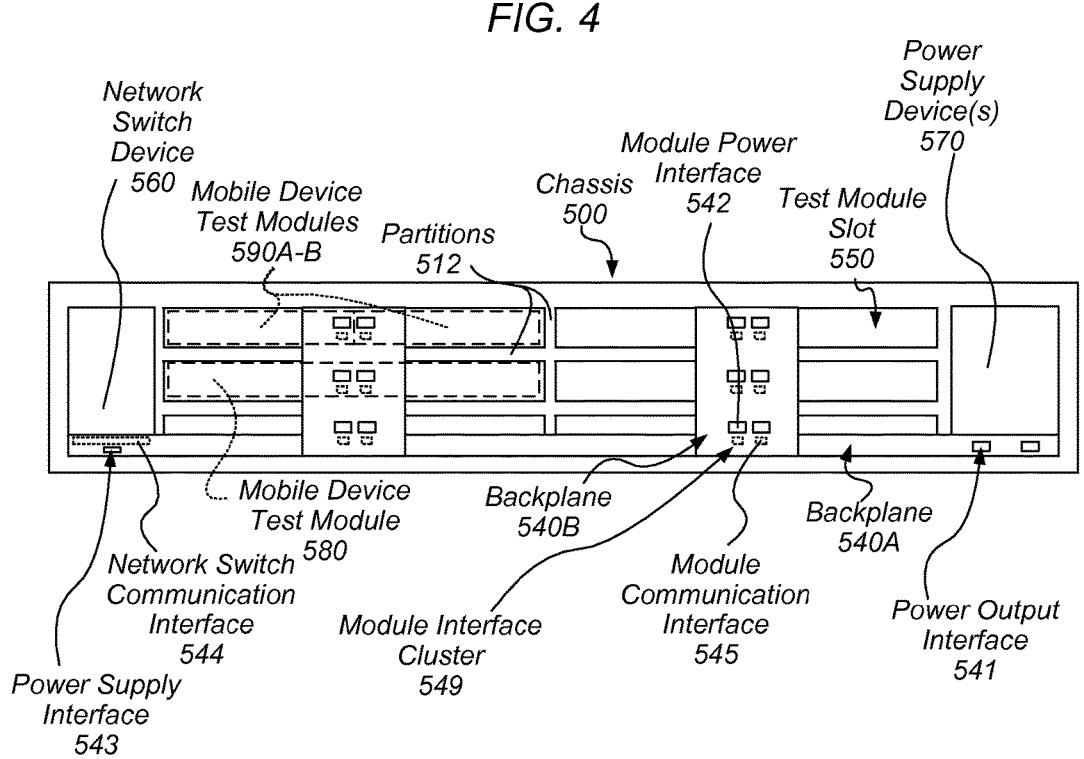
FIG. 5 is a schematic diagram that illustrates an orthogonal view of a test module chassis which include slots configured to receive and support mobile device test modules, according to some embodiments.

FIG. 5 is a schematic diagram that illustrates an orthogonal view of a test module chassis which include slots configured to receive and support mobile device test modules, according to some embodiments. The chassis, devices etc. illustrated in FIG. 5 can include the chassis and devices illustrated and discussed with reference to at least FIG. 1-3.

In some embodiments, a test module chassis includes multiple horizontally-oriented slots, where the shortest dimension of each slot is the vertical dimension. The horizontally-oriented slots can be arranged in various rows and column configurations in the chassis and can support one or more mobile device test modules having various heights, so that each slot can support one or more modules which collectively occupy a volume corresponding to the volume of the slot.

As shown in FIG. 5, chassis 500 includes a housing 510 and partitions 512 which collectively establish a set of mobile device test module slots 550 which are each configured to support at least one mobile device test module. The housing 510 and at least some partitions further establish portions of the enclosure of the housing in which infrastructure modules, including one or more network switch devices 560 and one or more power supply devices 570, can be installed. The network switch device 560 and power supply devices 570 can be coupled to mobile device test modules installed in slots 550 so that the network switch device 560 communicatively couples the modules to a communication network, thereby providing communication support to the modules, and the power supply device 570 provides electrical power support to the modules.

In some embodiments, a device that is received into a slot can be coupled with an intermediary device, which includes a backplane circuit board assembly which comprises multiple backplane components which collectively form a backplane, via coupling with one or more connector interfaces included in the backplane. Where the backplane is communicatively coupled to an external service, system, etc., coupling the device with the backplane connector can communicatively couple the device with the external service, system, etc. In the illustrated embodiment, chassis 500 includes a backplane, comprising multiple backplane components 540A-B, which includes multiple module interface clusters which are each configured to align with a separate slot 550 in the chassis, and where each interface cluster 549 includes one or more communication connector interfaces 545 and power connector interfaces 542, so that a device, including a mobile device test module, that is inserted into and supported in the one or more particular slots 550 can be coupled to the connector interfaces 542, 545 in the cluster 549 aligned with the one or more particular slots to communicatively couple the device to the external system, service, etc. via the backplane 540. Where a device is inserted, received, etc. into a slot so that the device is supported by structural members establishing the slot and is communicatively coupled to one or more external systems, services, etc. via coupling with one or more connector interfaces that correspond to the slot, the device may be understood to be "installed" in the slot. Installing a device in a slot can include sliding the device into one end of the slot, where a connector interface on the device couples with a backplane connector interface on another end of the slot as the device is inserted into the slot and structural members establishing the slot 550 transmit at least some of the structural load of the device through the chassis. The interfaces 542, 545, in some embodiments, are blind mate connectors configured to couple with corresponding blind mate connectors in one or more mobile device test modules mounted in one or more of the slots 550.

As shown, backplane 540 includes power output interfaces 541 which can couple with power supply devices 570, so that the backplane can provide power support to devices coupled to interfaces 543, 542. The backplane 540 further includes the network switch communication interface, so that the backplane can communicatively couple devices coupled to interfaces 545 with the network switch device 560.

As shown, the backplane 540, and connector interface clusters 549 included thereon, can be configured to link multiple mobile device test modules mounted in a common slot to power and communication support. As shown, each cluster 549 includes a symmetrical arrangement of power connector interfaces 542 and communication connector interfaces 545 in a "side-by-side" configuration so that at least two mobile device test modules 590A-B, installed in a single slot 550 in a "side-by-side" mirrored configuration, can each couple with separate interfaces 542, 545 in the cluster 549 aligned with the single slot 550. The same slot 550 and corresponding interface cluster 549 can support a larger single module 580, where the larger module can couple with some or all of the interfaces 542, 545 in the cluster 549. As a result, the slot 550 can support one or more various modules of various shapes and sizes. For example, where module 580 includes a tablet mobile device, the module may be larger, such that the module 580 encompasses an entirety of the available space in a slot 550, while modules 590A-B can each include smartphone mobile devices, thereby being smaller, such that two modules 590A-B encompass a similar amount of space as a single module 580, so that two modules 590 can be installed in a single slot which could otherwise support a single module 580. The modules 580, 590A-B can be reversibly installed and swapped as desired. In some embodiments, a module 580 is configured to couple to multiple interfaces of a common type in an interface cluster 549, so that the module establishes redundant links with one or more of communication support, power support, etc. For example, in the illustrated embodiment, module 580 can couple with each of the communication connector interfaces 545 and each of the power connector interfaces 542 in the closure 549 of the slot in which module 580 is installed, so that the module 580 is linked to the network switch device 560 via redundant communication links and is further linked to the power supply devices 570 via redundant power links.

Figure 6:
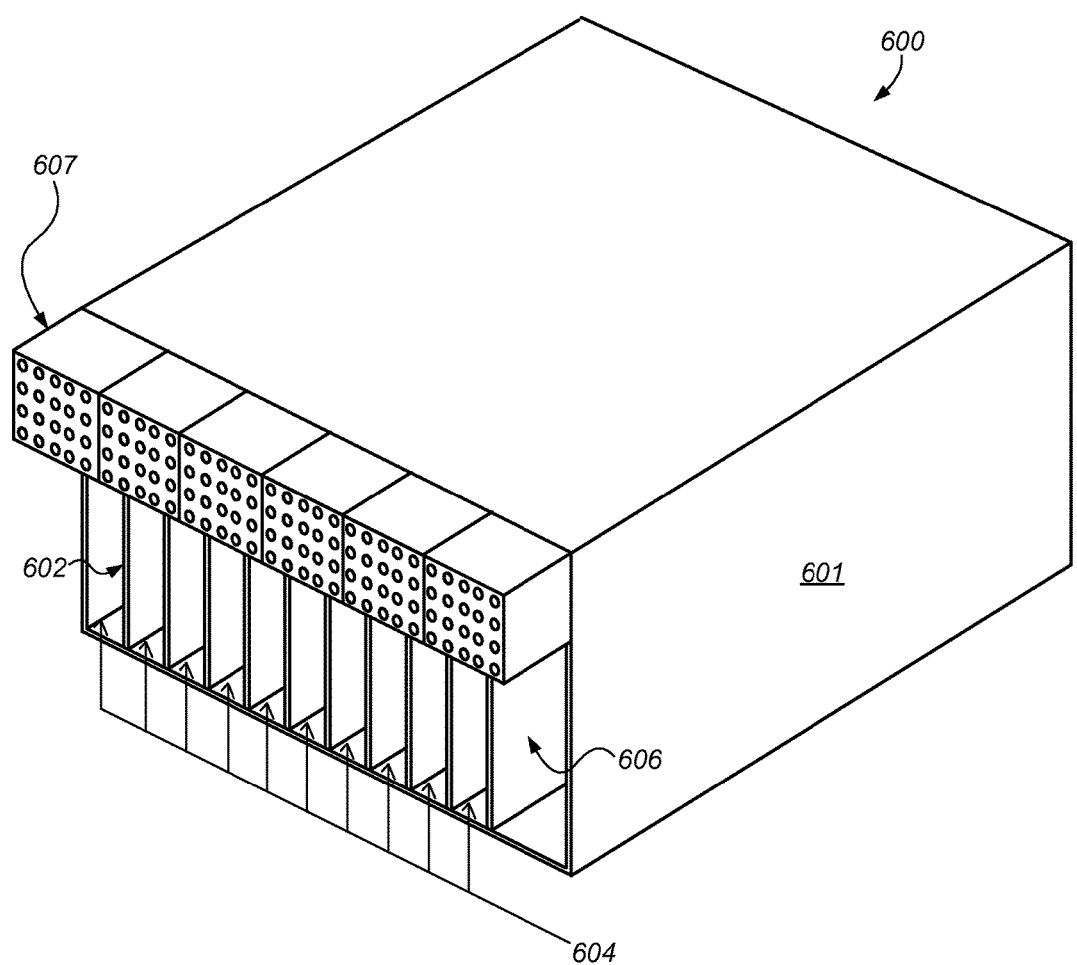
FIG. 6 illustrates a perspective view of a rear end of a test module chassis that includes various slot spaces to receive and support various mobile device test modules and various air moving devices, according to some embodiments.

FIG. 6 illustrates a perspective view of a rear end of a test module chassis that includes various slot spaces to receive and support various mobile device test modules and various air moving devices, according to some embodiments. The chassis, devices etc. illustrated in FIG. 6 can be implemented in one or more of the test module chassis illustrated and discussed with reference to at least FIG. 1-5.

Test module chassis 600 includes a housing 601, dividers 602, various slots 604, 606 which can receive and support one or more various devices, and an array of air moving devices 607 that can induce air flow through the slots to cool components supported in the slots.

In some embodiments, air moving devices 607 can be coupled to one or more ends of a chassis and can operate to induce airflow through one or more slots in the chassis, where the airflow through a given slot can remove heat from one or more components of one or more devices installed in the slot. Air moving devices can be coupled to the chassis individually, as part of an array of air moving devices, etc. Air moving devices can be coupled to a front end of the chassis, a side end, a top end, bottom end, some combination thereof, or the like. In the illustrated embodiment, for example, an array of air moving devices 607 is coupled to a rear end of a chassis 600. Various devices, including mobile device test modules, network switch devices, power supplies, computer systems, etc. may be installed in various slots 604, 606, and the air moving devices 607 can operate to induce airflow through one or more of the slots to cool various heat producing components included in devices supported in the one or more slots.

In some embodiments, various amounts of airflow are induced through various separate slots, based at least in part upon various couplings of air moving devices to the test module chassis. For example, where a slot 606 is configured to receive and support a network switch device, as opposed to a mobile device test module, and where the network switch device has greater cooling requirements than a mobile device test module, which may be supported in a slot 604 configured to receive and support the mobile device test module, additional air moving devices 607 may be coupled to the chassis 600 to induce airflow through slot 606, relative to the air moving devices 607 coupled to the chassis 600 to induce airflow through one or more various slots 604.

Figure 7:
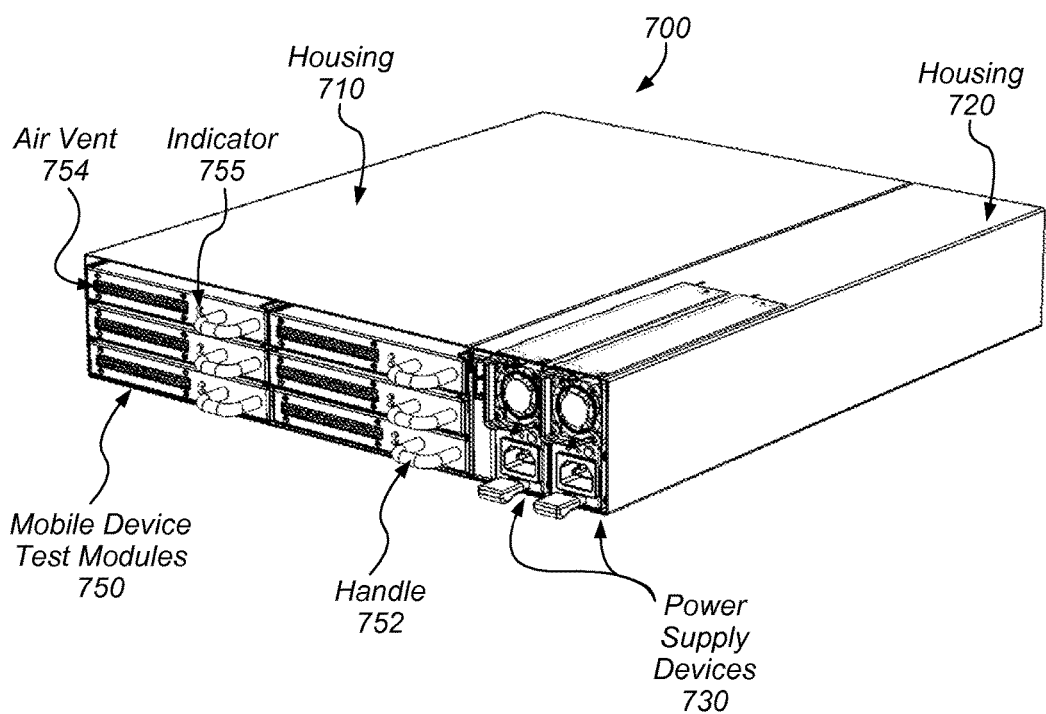
FIG. 7 illustrates a perspective view of a test module chassis that includes multiple installed mobile device test modules and power supply devices, according to some embodiments.

FIG. 7 illustrates a perspective view of a test module chassis that includes multiple installed mobile device test modules and power supply devices, according to some embodiments. The chassis, modules, devices etc. illustrated in FIG. 7 can be implemented in one or more of the test module chassis illustrated and discussed with reference to at least FIG. 1-6.

FIG. 7 illustrates a test module chassis 700 which includes multiple mobile device test modules 750 and power supply devices 730 installed therein. It will be understood that the chassis 700 can include additional components not shown in FIG. 7, including one or more backplanes as shown in FIG. 4-5, one or more network switch devices as shown in FIG. 4-5, some combination thereof, etc.

Chassis 700 includes two housings 710, 720 which are coupled together and are each configured to support separate types of devices. As shown, housing 710 encompasses a portion of chassis 700 which is configured to support at least mobile device test modules 750, and housing 720 encompasses a portion of chassis 700 which is configured to support at least power supply devices 730. In some embodiments, housings 710 and 720 are a single housing which includes multiple structural elements, members, etc. which partition the housing into separate portions represented by housings 710, 720.

Chassis 700 includes multiple mobile device test modules 750 installed in the housing 710. The modules 750, which are illustrated and discussed further in FIG. 9-10, each include a handle 752, indicator 755, and air vent 754. The modules 750 are shown installed in a "front" end of the chassis 700, where the modules 750 are each configured to be reversibly installed in the housing 710 through the front end. As shown, each module 750 includes a handle 752 which can be manipulated to remove or install a given module 750 in the housing 710. In addition, each module 750 includes an air vent 754 which can receive air into an interior of the module 750 to remove heat from heat-generating components included in the module 750 and an indicator which can indicate, to an external observer, one or more states of one or more portions of the module 750 via a visual signal.

It will be understood that, in some embodiments, housing 750 includes multiple slots, established by various structural elements, members, etc. comprising the housing 710, which are configured to accommodate and structurally support one or more mobile device test module 750 in the chassis 700. In some embodiments, the housing includes one or more sets of support structures, including one or more rail structures, which are configured to slidably couple with one or more support structures included in one or more mobile device test module housings to align and support the one or more mobile device test modules in certain positions within the housing 710.

As shown, the chassis 700 includes multiple power supply devices 730 which are coupled to the modules 750 via one or more sets of power transmission lines (not shown in FIG. 7), which can include one or more backplanes and connector interfaces included thereon, as illustrated in FIG. 4-5. The multiple power supply devices 730 can be coupled to all of the installed modules 750 in parallel, such that the multiple power supply devices provide 2N power support redundancy to the modules 750 so that the modules 750 continue to receive full power support through at least one power supply device 730 in the event that the other power supply device 730 fails to provide power support. It will be understood that, in some embodiments, various numbers of power supply devices can be installed in a test module chassis and coupled to various mobile device modules installed therein to provide various types of power support redundancy to at least some of the mobile device modules installed in the test module chassis.

As shown in the illustrated embodiment of FIG. 7, a chassis 700 can be configured to accommodate and support mobile device test modules in a horizontally-oriented configuration, where the modules 750 can be slidably installed in the chassis, in a horizontal orientation, from one or more of a front, rear, or side end of the chassis 700. The modules 750 can be slidably installed or removed from the chassis 700 while the chassis is installed in a rack, such that the modules 750 can be reversibly installed in a chassis 700 via one or more of a front end, side end, rear end, etc. of the rack.

Figure 8:
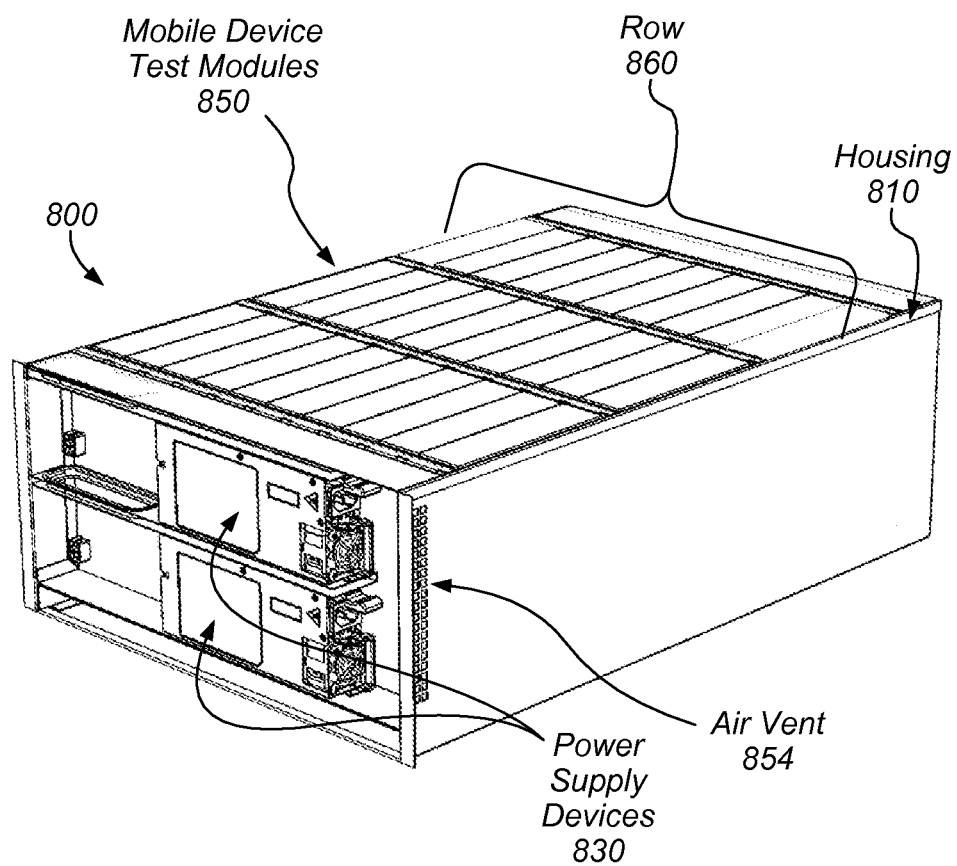
FIG. 8 illustrates a perspective view of a test module chassis that includes multiple installed mobile device test modules and power supply devices, according to some embodiments.

FIG. 8 illustrates a perspective view of a test module chassis that includes multiple installed mobile device test modules and power supply devices, according to some embodiments. The chassis, modules, devices etc. illustrated in FIG. 8 can be implemented in one or more of the test module chassis illustrated and discussed with reference to at least FIG. 1-6.

FIG. 8 illustrates a test module chassis 800 which includes multiple mobile device test modules 850 and power supply devices 830 installed therein. It will be understood that the chassis 800 can include additional components not shown in FIG. 8, including one or more backplanes as shown in FIG. 4-5, one or more network switch devices as shown in FIG. 4-5, some combination thereof, etc.

Chassis 800 includes housing 810 which is configured to support separate types of devices. As shown, housing 810 is configured to support at least mobile device test modules 850 and power supply devices 830. In some embodiments, housing 810 includes multiple structural elements, members, etc. which partition the housing 810 into separate portions which support separate devices.

Figure 9:
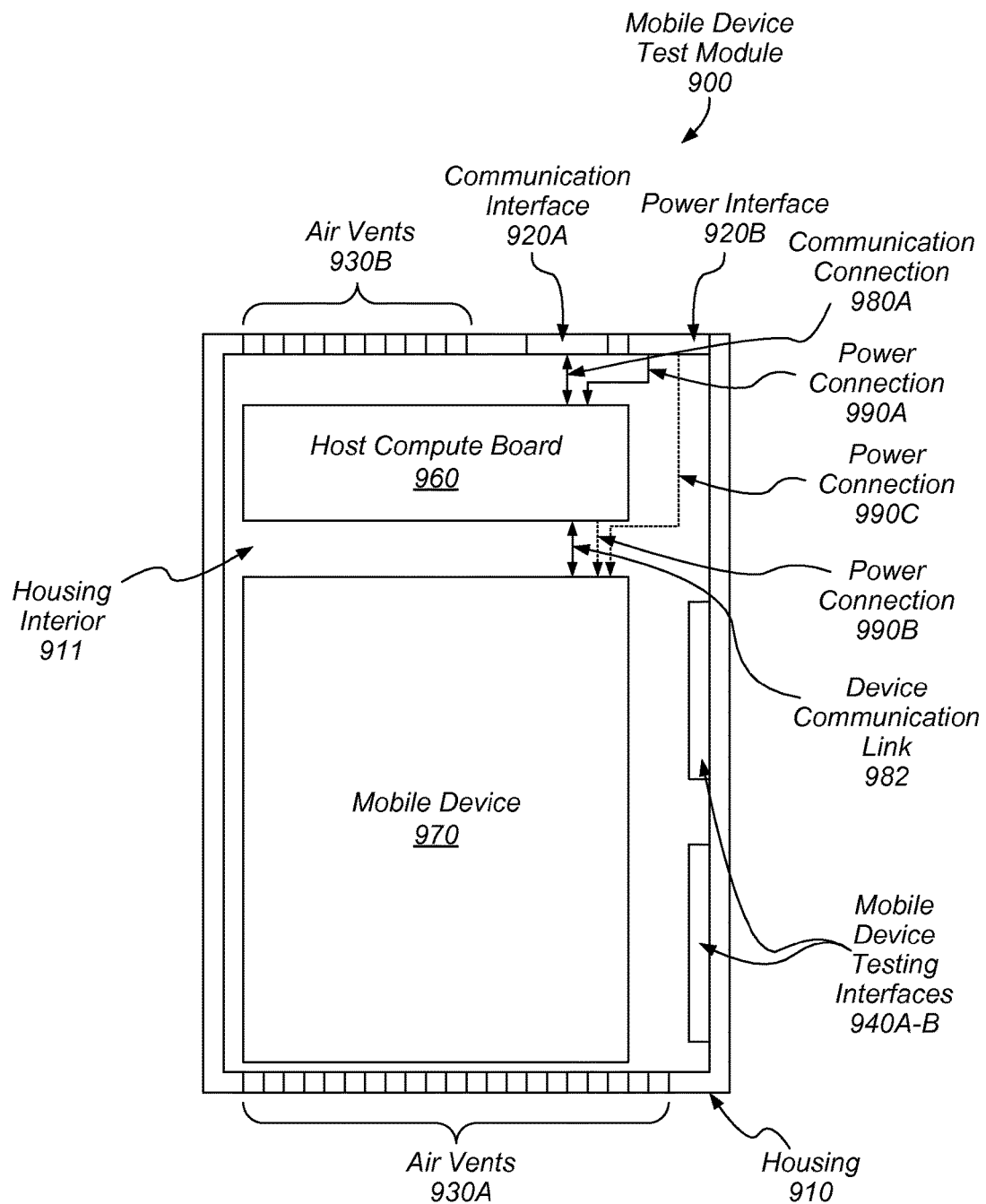
FIG. 9 illustrates a mobile device test module which includes a host compute board and a mobile device which is linked to the host compute board via at least a communication link, according to some embodiments.

Chassis 800 includes multiple mobile device test modules 850 installed in the housing 810. The modules 850, which are illustrated and discussed further in FIG. 9-10, are shown installed, in a vertical orientation through a "top" end of the chassis 800, where the modules 850 are each configured to be reversibly installed in the housing 810 through the top end.

It will be understood that, in some embodiments, housing 850 includes multiple slots, established by various structural elements, members, etc. comprising the housing 810, which are configured to accommodate and structurally support one or more mobile device test module 850 in the chassis 800. In some embodiments, the housing includes one or more sets of support structures, including one or more rail structures, which are configured to slidably couple with one or more support structures included in one or more mobile device test module housings to align and support the one or more mobile device test modules in certain positions within the housing 810. In the illustrated embodiment shown in FIG. 8, one or more sets of structural elements included in housing 810 establish three parallel sets of slot spaces which extend vertically to the top end of the chassis 800, so that mobile device test modules 850 can be installed through the top end of the chassis 800 into the slots and can similarly be removed from the slots through the top end of the chassis 800.

As shown, the chassis 800 includes multiple power supply devices 830 which are coupled to the modules 850 via one or more sets of power transmission lines (not shown in FIG. 8), which can include one or more backplanes and connector interfaces included thereon, as illustrated in FIG. 4-5. The multiple power supply devices 830 can be coupled to all of the installed modules 850 in parallel, such that the multiple power supply devices provide 2N power support redundancy to the modules 850 so that the modules 850 continue to receive full power support through at least one power supply device 830 in the event that the other power supply device 830 fails to provide power support. It will be understood that, in some embodiments, various numbers of power supply devices can be installed in a test module chassis and coupled to various mobile device modules installed therein to provide various types of power support redundancy to at least some of the mobile device modules installed in the test module chassis.

As shown in FIG. 8, chassis 800 includes an air vent 853 which enables air flow through a portion of the chassis 800 in which the power supply devices 830 are mounted. As shown, the portion includes an open space on an opposite end of the chassis 800 relative to the end in which the vent 854 is located, such that air can flow between opposite ends of the chassis, through the power supply devices in parallel streams, via the open space and the vent 854, to remove heat from the power supply devices 830. It will be understood that, in some embodiments, the chassis 800 is configured to support the power supply devices in various relative configurations. For example, the illustrated embodiment shown in FIG. 8 shows the power supply devices 830 installed in a vertically-oriented parallel configuration in chassis 800, also referred to as an "over-under" configuration. In another example, the illustrated embodiment shown in FIG. 7 shows the power supply devices 730 installed in a horizontally-oriented parallel configuration in chassis 700 also referred to as a "side-by-side" configuration.

As shown in the illustrated embodiment of FIG. 8, a chassis 800 can be configured to accommodate and support mobile device test modules in a vertically-oriented configuration, where the modules 850 can be slidably installed in the chassis, in a horizontal orientation, from one or more of a top or bottom end of the chassis 800. As shown in FIG. 8, the chassis 800 is configured to support the modules 850 in a transverse configuration, where the modules are installed transverse to a "front" end of the chassis which is distal from the broad face of the chassis 800 on which the vent 854 is located, which can be the "rear" end of the chassis. In some embodiments, the modules are installed in in a configuration which is not transverse to the front end of the chassis.

In some embodiments, each row 860 of modules 850, of the three rows of modules, is configured to be slidably translated from the chassis 800 through one or more ends of the chassis, including the front end, such that modules 850 installed in the row 860 can be reversibly installed in the row, in a vertical direction, independently of a top end of the chassis 800. As a result, the modules 850 can be slidably installed or removed from the chassis 800, in a vertical direction, while the chassis is installed in a rack, such that the row 860 of modules can be slidably translated through one or more of a front end, side end, rear end, etc. of the rack and one or more modules 850 can be installed or removed from a support structure comprising the row 860. The support structure can include a backplane which includes connector interfaces, a rail structure which aligns and guides the row in and out of the chassis, etc.

FIG. 9 illustrates a mobile device test module which includes a host compute board and a mobile device which is linked to the host compute board via at least a communication link, according to some embodiments. The mobile device test module illustrated in FIG. 9 can be included in any of the mobile device test modules illustrated and discussed with reference to at least FIG. 1-8.

Mobile device test module 900 includes a housing 910 which at least partially encloses an interior enclosure 911 of the housing. In some embodiments, the housing is comprised of one or more materials which at least partially inhibit RF EM radiation from passing through the housing 910 material, such that wireless communication links between a device located in the interior enclosure 911 and a device located external to the module 900 are at least partially restricted.

The module 900 includes a mobile device 970 installed within the interior of the housing 911. The mobile device 970 can include one or more various devices, including a smartphone device, tablet computer device, etc.

The module 900 includes at least one instance of processing circuitry 960 coupled to the interior of the housing and, as shown, can include a host compute board. In some embodiments, multiple instances of processing circuitry are included in the housing interior. In some embodiments, the at least one instance of processing circuitry comprise one or more computer systems and are configured to establish at least one device communication link with the mobile device 970 and command the device 970 to at least execute a mobile device application received from a remote source.

In some embodiments, the module housing 911 includes one or more sets of air vents which enable air flow through the housing interior 911 to remove heat from one or more heat-generating components included in one or more of the mobile device 970, one or more instances of processing circuitry 960, etc. As shown, housing 910 includes a set of air vents 930A-B located on opposite ends of the housing 910, where the air vents 930A-B establish at least one air passageway through the interior 911 between the opposite ends, so that air entering the housing interior 911 at one end, via one of the vents 930A-B, can flow through the interior 911 to an opposite end and exit the interior 911 via another of the air vents 930A-B.

In some embodiments, the module 900 includes one or more connector interfaces which are coupled to at least the at least one instance of processing circuitry and enable the at least one instance of processing circuitry to be communicatively coupled to a communication network and electrically coupled to a power source. As shown, module 900 includes a communication connector interface 920A and a power connector interface 920B. The interfaces 920A-B, in some embodiments, are blind mate connectors configured to couple with corresponding blind mate connectors in a test module chassis. The interfaces 920A-B, in some embodiments, can be coupled to corresponding communication and power connector interfaces included in a backplane of a test module chassis, so that installing the module 900 in a slot of a test module chassis includes coupling the connector interfaces 920A-B of the module 900 with the corresponding connector interfaces of the test module chassis to couple the instance of processing circuitry 960 to power and communication support.

As shown, the instance of processing circuitry 960 is coupled to the communication connector interface 920A via a communication connection 980 and is coupled to the power connector interface 920B via a power connection 990A. Connections 980A, 990B can be hardline connections, established via communications cabling for connection 980A and power cabling for connection 990B. As shown, the mobile device 970 is not directly coupled to the communication connector interface 920A.

In some embodiments, mobile device 970 is electrically coupled to a power source via a power connection 990B with at least one instance of processing circuitry 960 included in the module, so that the mobile device 970 receives power support through the at least one instance of processing circuitry 960 and connection 990A supplies electrical power support to both the at least one instance of processing circuitry 960 and the mobile device 970. In some embodiments, the mobile device 970 is directly coupled to the power connection interface 920 via a separate power connection 990C which bypasses the one or more instances of processing circuitry 960, so that the mobile device 970 and at least one instance of processing circuitry receive power support via independent connections 990A, 990C. In some embodiments, mobile device 970 is coupled to a separate power interface relative to the power connection interface 920B to which the at least one instance of processing circuitry 960 are coupled. For example, where the module 900 is configured to be installed in a test module chassis which includes a direct-current power rail, bus bar, etc., the mobile device 970 can The one or more instances of processing circuitry 960 are communicatively coupled to mobile device 970 via one or more device communication links 982, which can include one or more wireless communication links. Instance 960 can generate commands which, when transmitted to the mobile device 970 via link 982, cause the mobile device 970 to execute one or more programs of instruction, including a mobile device application received at the instance from a remotely-located client via interface 920A. For example, the instance 960 can receive a mobile device application from a remotely-located client via a communication network, through interface 920A and can further receive a command from the client to test the mobile device application on the mobile device 970. Based on the command, the instance 960 can transmit the application to the mobile device 970 and generate one or more commands to the mobile device which cause the mobile device to execute some or all of the mobile device application. A command to test the mobile device application on the mobile device can include a command to execute one or more portions of the application, utilize the application to perform one or more functions on the mobile device, generate one or more outputs, some combination thereof, etc. and the instance 960 can generate command signals that, when transmitted to the mobile device 970 via link 982 cause the mobile device to execute the commanded actions. The instance e 960 can further interact with the mobile device 970, via one or more links 982, to monitor one or more aspects of the mobile device 970 concurrently with the mobile device executing the mobile device application, as part of testing the mobile device application.

In some embodiments, a mobile device test module includes one or more testing interfaces with which at least one instance of processing circuitry included in the module can be communicatively coupled and can utilize to monitor the mobile device, interact with one or more portions of the mobile device, some combination thereof, etc. concurrently with the mobile device executing the mobile device application, as part of testing the mobile device application. Such utilization can be based on executing, at the instance 960, a testing application as part of testing the mobile device application, a command received from the remote client, some combination thereof, etc.

As shown, module 900 includes testing interfaces 940 located in the interior 911 of the housing 910. The interfaces 940 can include one or more of a camera device, a micro-actuator device, a positional adjustment assembly, some combination thereof, etc. The interfaces 940A-B can be communicatively and electrically coupled to the one or more instances of processing circuitry 960.

Figure 10A:
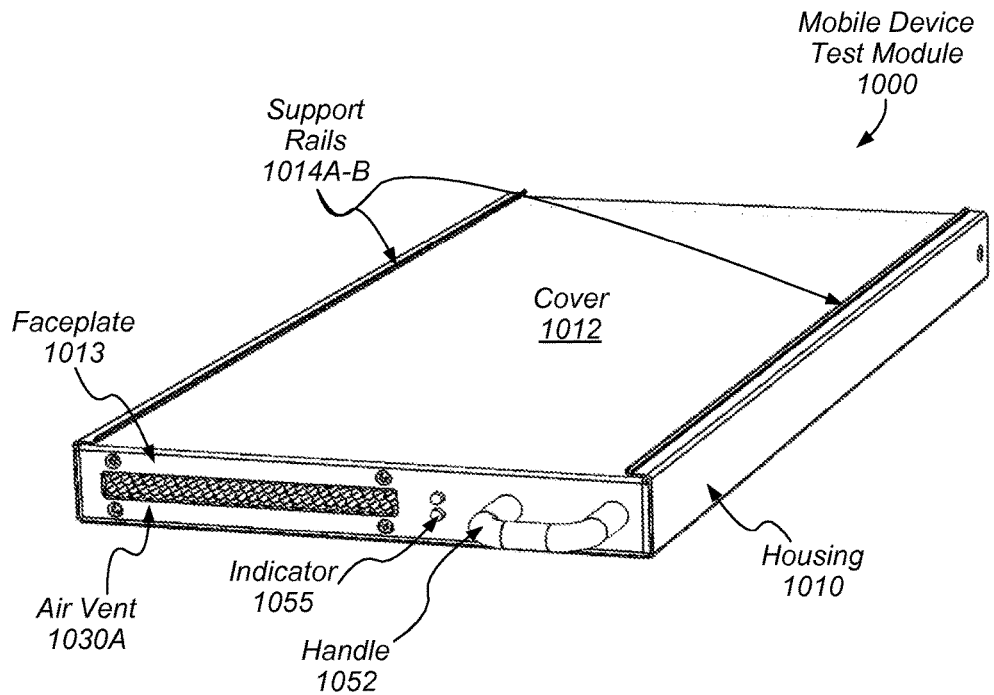
FIG. 10A-B illustrate perspective views of a mobile device test module, according to some embodiments.
Figure 10B:
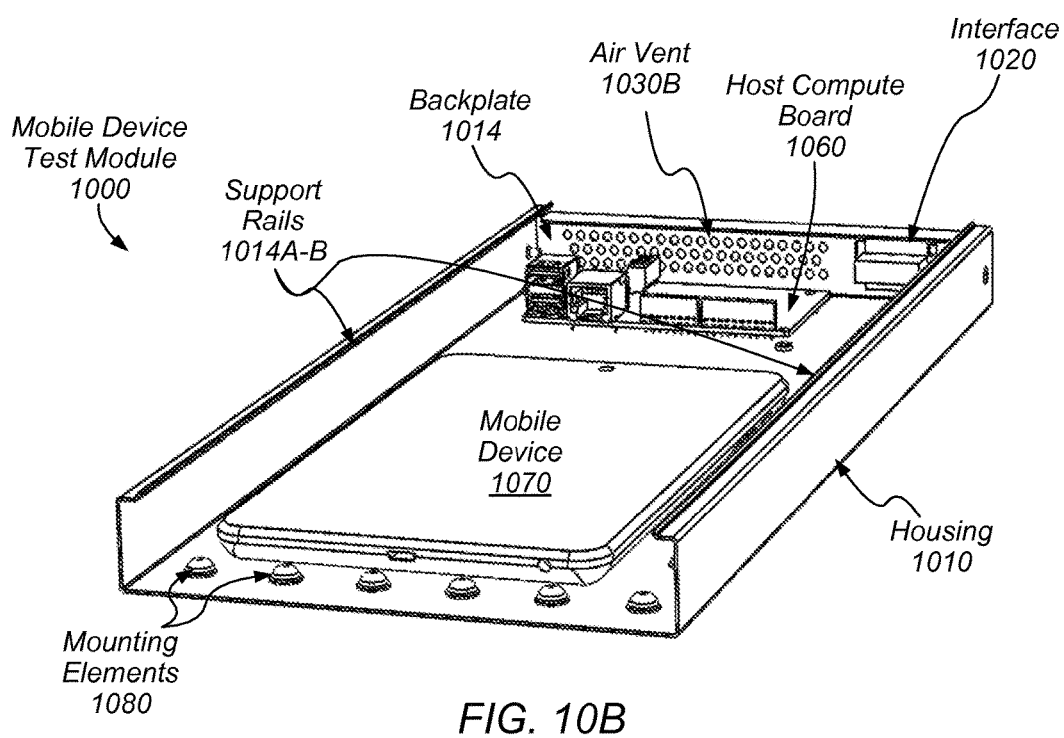

FIG. 10A-B illustrate perspective views of a mobile device test module, according to some embodiments. The mobile device test module illustrated in FIG. 10A-B can be included in any of the mobile device test modules illustrated and discussed with reference to at least FIG. 1-9.

In the illustrated embodiment of FIG. 10A, a mobile device test module 1000 includes a housing 1010, a faceplate 1013 which includes at least one air vent 1030A on one end of the module housing 1010, a set of indicators 1055, and a handle 1052, a cover 1012 that can adjustably expose or enclose the interior enclosure of the housing 1010, and a set of support rails 1014A-B which can align the module 1000 in a slot of a test module chassis.

As shown in FIG. 10A-B, the cover 1012 and faceplate 1013 can be coupled together, such that the cover 1012 and faceplate 1013 can be removed together to expose the interior enclosure of the housing 1010. FIG. 10B shows that housing 1010 can further include a back plate 1014 which includes another air vent 1030B and one or more sets of connector interfaces 1020. FIG. 10B further shows that module 1000 includes an instance of processing circuitry 1060, which can include a host compute board, and a mobile device 1070 within the interior of the housing 1010.

In some embodiments, interfaces 1020 include open gaps in the housing 1010, and interfaces of the mobile device 1070 can be communicatively coupled to external services, systems, etc. directly via connectors that couple with the mobile device 1070 interfaces through the gaps 1020.

In some embodiments, module 1000 includes an interior enclosure that, in cooperation with one or more air vents 1030A-B in opposite ends of the module housing 1010, establishes one or more air passages through the interior enclosure of the housing 1010. When a mobile device 1000 is installed in the interior enclosure, and the cover 1012 and faceplate 1013 are installed to enclose the interior of the housing as shown at FIG. 10A, the air passages can direct airflow through the interior enclosure to remove heat from various components included in one or more of the mobile device 1070, the at least one instance of processing circuitry 1060 included in the module interior enclosure, etc.

In some embodiments, a mobile device test module includes one or more sets of mounting elements that can couple to a mobile device installed in the interior of the module to hold the mobile device in place within the enclosure. For example, as shown in FIG. 10B, module 1000 includes a set of mounting elements 1080 in the interior of housing 1010 that can couple with device 1070 when device 1070 is inserted into the enclosure to hold the mobile device 1070 in place within the module 1000, thereby providing structural support and stability to the mobile device 1070 within the module 1000 interior. In some embodiments, one or more of the mounting elements are comprised of one or more shock-absorbing materials, and coupling one or more mounting elements with a mobile device 1070 comprises the mobile device 1070 resting upon one or more of the mounting elements 1080, such that the one or more mounting elements 1080 provide structural support and stability to the mobile device 1070 within the module 1000 interior based at least in part upon friction between the mounting elements 1080 and the mobile device 1070.

Figure 11A:
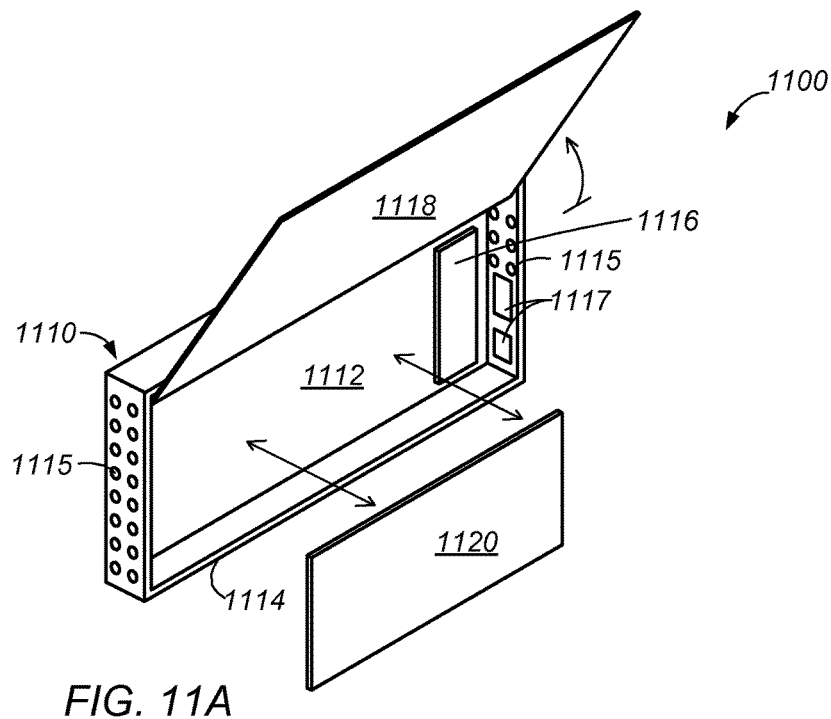
FIG. 11A-C illustrate perspective views of a mobile device test module in which a mobile device can be installed, according to some embodiments.
Figure 11B:
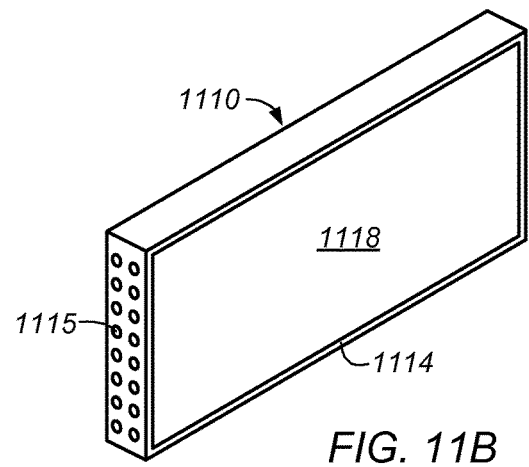
Figure 11C:
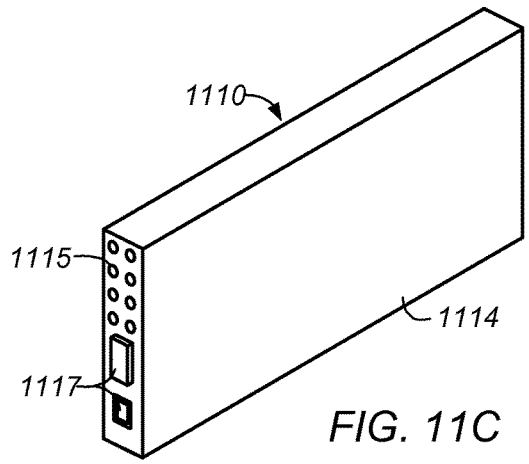

FIG. 11A-C illustrate perspective views of a mobile device test module in which a mobile device can be installed, according to some embodiments. The mobile device test module illustrated in FIG. 11A-C can be implemented in one or more of the multi-unit hubs, processor units, etc. illustrated and discussed with reference to at least FIG. 1-10.

In some embodiments, an individual mobile device, which can include one of a plurality of mobile devices, can be installed in a mobile device test module, and the mobile device test module can be installed in one or more slots of a test module chassis, to configure at least one instance of processing circuitry included in the module to be communicatively coupled to one or more external services, systems, etc., including a communication network and to configure at least one instance of processing circuitry included in the module to be communicatively coupled, via one or more device communication links, with the mobile device installed in the module. The mobile device test module can provide structural support and stabilization of a mobile device installed therein and can enable communicative coupling of the mobile device with one or more instance of processing circuitry included in the module. In some embodiments, a mobile device test module can enable cooling of various components included in the housing of the module, including an installed mobile device, at least one instance of processing circuitry included in the module, etc.

In the illustrated embodiment of FIG. 11A, a mobile device test module system 1100 includes a mobile device test module 1110 and a mobile device 1120. The module 1110 includes a housing 1114, an interior enclosure 1112 of the housing, at least one instance of processing circuitry 1116, at least some ventilation ports 1115 on one or more ends of the module housing 1114, interfaces 1117 on at least one end of the module housing 1114, and a hatch 1118 that can adjustably expose or enclose the interior enclosure 1114. The at least one instance of processing circuitry can be implemented by one or more computer systems and can include a host compute board. As shown, the mobile device 1120 can be inserted into the interior enclosure 1112 of the module housing 1114.

In some embodiments, inserting the mobile device 1120 into the enclosure 1112 includes coupling one or more interfaces of the mobile device 1120, including power connectors, communication connectors, etc. with corresponding interfaces 1117 of the housing 1114 to enable the mobile device 1120 to be communicatively coupled to one or more external systems, services, etc. via the interfaces 1117 of the processor unit case. Such coupling includes communicatively coupling the mobile device 1120 to the instance of processing circuitry 1116, where the instance 1116 is communicatively coupled to a communication interface 1117, to establish a device communication link between the instance 1116 and the device 1120. In some embodiments, the device communication link established between instance 1116 and mobile device 1120 includes one or more of a wireless communication link, a sideband communication link, a wired communication link, some combination thereof, etc. Such coupling can include coupling a power interface of the mobile device 1120 with an interface of the instance of processing circuitry 1116, such that the mobile device receives power from a power interface 1117 via the instance of processing circuitry 1116.

In some embodiments, interfaces 1117 include open gaps in the housing 1114, and interfaces of the mobile device 1120 can be communicatively coupled to external services, systems, etc. directly via connectors that couple with the mobile device 1120 interfaces through the gaps 1117.

In some embodiments, module 1110 includes an interior enclosure 1112 that, in cooperation with one or more ventilation ports 1115 in one or more sides of the module housing 1114, establishes one or more air passages through the interior enclosure 1112. When a mobile device 1120 is installed in the interior enclosure 1112, the air passages can direct airflow through the interior enclosure 1112 to remove heat from various components included in one or more of the mobile device 1120, the at least one instance of processing circuitry 1116 included in the module interior enclosure 1112, etc.

In some embodiments, a mobile device test module includes one or more sets of mounting elements that can couple to a mobile device installed in the interior of the module to hold the mobile device in place within the enclosure. For example, module 1110 can include one or more mounting elements in enclosure 1112 that can couple with device 1120 when device 1120 is inserted into the enclosure 1112 to hold the mobile device 1120 in place within the module 1110, thereby providing structural support and stability to the mobile device 1120 within the module 1110 interior 1112. In some embodiments, one or more of the mounting elements are comprised of one or more shock-absorbing materials.

As shown in FIG. 11A, a mobile device test module 1110 can include a hatch 1118 that can rotate to an open position to expose the interior enclosure 1112 to enable a mobile device 1120 to be installed or uninstalled in the enclosure 1112. As shown in FIG. 11B, a module 1110 can include a hatch 1118 that can rotate to a closed position to enclose the enclosure 1112. When a mobile device 1120 is installed in the enclosure, the hatch 1118 can rotate to the closed position to provide at least some structural support and protection to the mobile device 1120 from external forces, including side shocks, particulate matter, etc. In some embodiments, the hatch 1118 can enclose the interior enclosure 1112 to establish an air passage through the enclosure 1112 between ventilation ports 1115 on separate ends of the module 1110, enabling cooling of components included in the installed mobile device 1120, the at least one instance of processing circuitry 1116, some combination thereof, etc. in the enclosure 1112.

As shown in FIG. 11C, an outer surface of a mobile device test module housing can include one or more interfaces 1117 that can be coupled to one or more interfaces to communicatively couple a mobile device 1120 installed in the interior enclosure 1112 of the module 1110 with one or more external services, systems, etc. In some embodiments, the interfaces 1117 include connectors to the enclosure 1112 and connectors to an external environment from the module 1110, so that a mobile device 1120 installed in the enclosure 1112 can be coupled with one or more connectors to the enclosure, and the one or more connectors to the external environment can be coupled to one or more connectors of various external services, systems, etc., to communicatively couple the mobile device 1120 to the various external systems, services, etc.

In some embodiments a mobile device test module can have structural dimensions that correspond to one or more form factors for a server rack. For example, the mobile device test module housing can have a height that corresponds to a 2U rack height.

In some embodiments, interfaces 1117 include open gaps in the housing 1114, and one or more interfaces of the mobile device 1120 can be communicatively coupled to external services, systems, etc. directly via connectors that couple with the mobile device 1120 interfaces through the gaps 1117. For example, a power interface of the mobile device 1120 can be coupled to a power transmission line, including a power cable, which extends from the power interface of the device 1120, through a gap 1117 in the housing 1114, and couples with a power rail, which can include a direct-current power rail, to electrically couple the device 1120 to a power supply.

Figure 12:
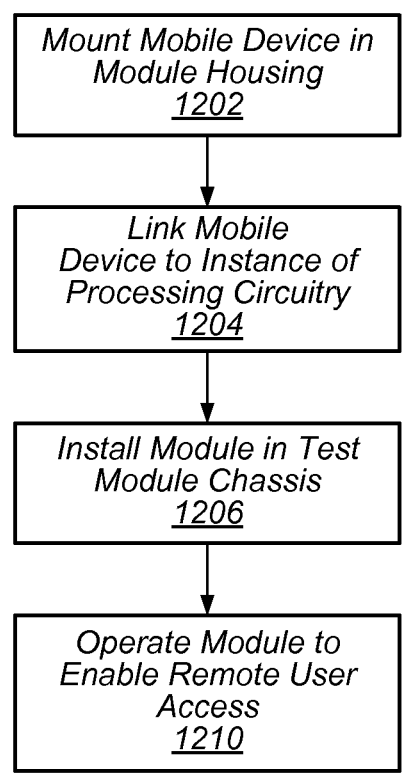
FIG. 12 illustrates configuring a mobile device test module to enable execution of remotely-developed mobile device programs of instructions on a mobile device included in the mobile device test module, according to some embodiments.

FIG. 12 illustrates configuring a mobile device test module to enable execution of remotely-developed mobile device programs of instructions on a mobile device included in the mobile device test module, according to some embodiments. The configuring can be implemented with regard to one or more of the mobile device test modules, test module chassis, mobile devices, clients, networks, etc. illustrated and discussed with reference to at least FIG. 1-11.

At 1202, a mobile device is mounted in an interior enclosure of a mobile device test module housing, so that the mobile device is structurally supported by the housing within the interior. One or more mounting elements can be coupled to the interior of the housing, so that the mobile device is at least partially structurally supported within the housing interior by one or more mounting elements. The mounting elements can hold the mobile device in place within the interior enclosure, stabilize the mobile device, etc. In some embodiments, one or more of the housing, mounting elements, etc. included in the module provides at least some structural support and stabilization to the mobile device. For example, the mounting elements of the housing can provide at least some shock absorption for the mobile device mounted in the housing.

At 1204, the mobile device is communicatively coupled to at least one instance of processing circuitry included in the mobile device test module via at least one device communication link. At least one instance of processing circuitry can be physically coupled to the interior enclosure of the module and can include one or more of a host compute board, an interface board, etc. The at least one instance of processing circuitry includes at least one communication interface which can establish the device communication link with the mobile device. The communication interface can include a wireless communication transceiver, a network communication cabling which includes a communication connector interface configured to couple with a communication connector interface of the mobile device, some combination thereof, etc.

In some embodiments, coupling the mobile device to the instance of processing circuitry to establish the device communication link includes coupling a communication connector interface extending from the instance of processing circuitry to a communication connector interface of the mobile device. In some embodiments, linking a mobile device to an instance of processing circuitry includes establishing a device communication link between the mobile device and a limited selection of the instances of processing circuitry included in the module. For example, where the module includes a host compute board and a separate interface board, where the host compute board is communicatively coupled to the interface board and the interface board is configured to establish a device communication link, link the mobile device to an instance of processing circuitry can include establishing a device communication link between the mobile device and the interface board, which can indirectly communicatively couple the mobile device to the host compute board, such that the host compute board can generate commands to control the mobile device via the interface board and the device communication link.

Ion some embodiments, the mobile device is electrically coupled to a power interface of an instance of processing circuitry, such that the mobile device receive electrical power support via the instance of processing circuitry. In some embodiments, the mobile device is coupled to an instance of power transmission lines which electrically couple the mobile device to a power source, independently of any instances of processing circuitry in the module, such that the mobile device and processing circuitry receive power independently of each other, which can result in the mobile device receiving electrical power support via a power pathway which bypasses any instances of processing circuitry included in the module.

As referred to herein, mounting a mobile device in a mobile device test module, such that the mobile device is structurally supported by the module, and configuring the mobile device to be communicatively and electrically coupled to power and communication sources is referred to as installing the mobile device in the module. In some embodiments, the device communication link is not established until the instance of processing circuitry receives electrical power from a power source, which can occur subsequent to installing the mobile device test module in a test module chassis. In such embodiments, installing the mobile device can include mounting the mobile device in the module housing and coupling one or more of the mobile device, instances of processing circuitry included therein, etc. to one or more communication and power interfaces of the module, so that the mobile device and instances of processing circuitry will receive power, and the instances of processing circuitry will be communicatively coupled to a communication network, when the communication and power interfaces of the module are coupled to a communication network and a power source, respectively.

In some embodiments, the module is configured to restrict device communication links extending to either of the one or more instances of processing circuitry or the mobile device included in the module to device communication links between the mobile device and one or more instances of processing circuitry included in the module, so that device communication links between either of the one or more instances of processing circuitry or the mobile device and devices external to the module are restricted. The module housing can be comprised of a material which at least partially inhibits RF EM transmissions through the housing material, such that wireless links through the housing material are restricted. As a result, the one or more instances of processing circuitry are restricted from controlling any other devices other than the mobile device included in the same mobile device test module as the instance of processing circuitry, and cross-talk between multiple mobile devices is also restricted.

At 1206, the mobile device test module is installed in a test module chassis. The mobile device test module can be inserted into a slot of the test module chassis that is established from various members of the chassis, including housing members, dividers, etc. Inserting the mobile device test module into the slot can include inserting the mobile device test module into the slot so that one or more interfaces included in the mobile device test module are coupled with one or more interfaces included in the test module chassis. The interfaces included in the test module chassis can include connector interfaces included in a backplane circuit board coupled to one or more ends of the slots of the test module chassis, so that inserting a mobile device test module through one end of the slot can include coupling an interface of the mobile device test module with a backplane circuit board connector interface at an opposite end of the slot. The connector interfaces can include blind mate connectors. In some embodiments, the connector interfaces included in the test module chassis include one or more of power connector interfaces, communication connector interfaces, etc. In some embodiments, installing a mobile device test module in a test module chassis slot includes inserting the mobile device test module into the slot so that a latch mechanism included in the test module chassis engages with the mobile device test module to hold the module in the slot. Connector interfaces can be coupled with a mobile device test module installed in a slot. Coupling connector interfaces can communicatively couple at least one instance of processing circuitry, the mobile device, some combination thereof, etc. which are included in the mobile device test module with one or more external service, systems, etc. including one or more external power supplies, one or more communication networks, etc.

In some embodiments, one or more network switch devices, power supplies, etc. can be installed in the test module chassis, where installing a mobile device test module in the test module chassis includes communicatively coupling the module with a communication network via establishing a connection between the module and a network switch device installed in the test module chassis. The connection can include a communication connection via one or more communication cables, including one or more USB cables and connectors, which establish a communication pathway between a module installed in a slot and a communication network via a communication pathway between the module and a network switch device included in the test module chassis. In some embodiments, a pathway between a network switch device and an installed mobile device test module includes a link with an expander device, as discussed further above.

In some embodiments, a network switch, power supply, some combination thereof, etc. included in a test module chassis can be installed in a slot of the test module chassis. The test module chassis can include one or more slots for a network switch, one or more slots for a power supply, etc., where the slots may be larger than slots for mobile device test modules and may include additional connectors in the slot, including a network cable connector, power output connector etc. The size of slots in the test module chassis can correspond to the respective structural dimensions of the network switch devices, power supplies, mobile device test modules, etc. so that a mobile device test module slot is sized to accommodate one or more mobile device test modules and not a network switch device, etc. The slot of a test module chassis can be established based at least in part upon various structural members of the test module chassis that can provide structural support and stabilization of a network switch device, power supply, mobile device test module, etc. installed in the slot.

At 1210, one or more of the components in mobile device test module are operated to enable remote user access to, and interaction with, at least some of the mobile device included in the module. Such access can include providing a mobile device application to an instance of processing circuitry included in the module and commanding the instance to test the mobile device application on the mobile device, where such testing can include commanding the mobile device to execute the mobile device application, monitoring one or more aspects of the mobile device concurrently with the execution, generating a report regarding the performance by the mobile device of the mobile device application, including a report on one or more aspects of the device concurrently with the execution. The at least one instance of processing circuitry included in the module can execute one or more such programs of instructions and generate one or more output signals. In some embodiments, the output signals include one or more messages, reports, etc. to the remote client over the communication network.

Figure 13:
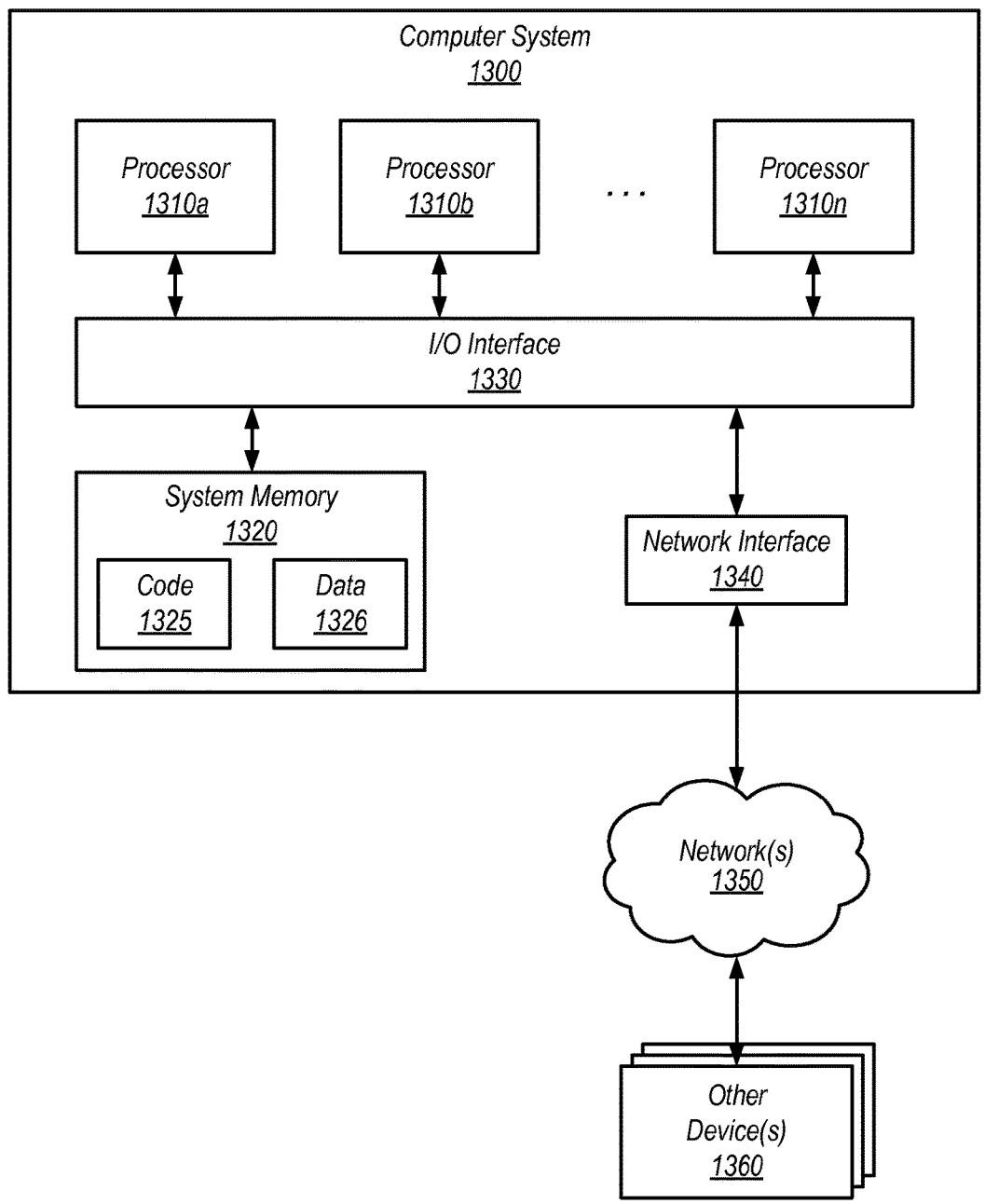
FIG. 13 is a block diagram illustrating an example computer system that may be used in some embodiments.

FIG. 13 is a block diagram illustrating an example computer system that may be used in some embodiments.

In some embodiments, a system that implements a portion or all of one or more of the technologies, methods, systems, devices, and apparatuses as described herein may include a general-purpose computer system that includes or is configured to access one or more computer-accessible media, such as computer system 1300 illustrated in FIG. 13. In the illustrated embodiment, computer system 1300 includes one or more processors 1310 coupled to a system memory 1320 via an input/output (I/O) interface 1330. In some embodiments, computer system 1300 further includes a network interface 1340 coupled to I/O interface 1330. In some embodiments, computer system 1300 is independent of a network interface and can include a physical communication interface that can couple with a communication pathway, including a communication cable, power transmission line, etc. to couple with various external components, systems, etc.

In various embodiments, computer system 1300 may be a uniprocessor system including one processor 1310, or a multiprocessor system including several processors 1310 (e.g., two, four, eight, or another suitable number). Processors 1310 may be any suitable processors capable of executing instructions. For example, in various embodiments, processors 1310 may be general-purpose or embedded processors implementing any of a variety of instruction set architectures (ISAs), such as the x86, PowerPC, SPARC, or MIPS ISAs, or any other suitable ISA. In multiprocessor systems, each of processors 1310 may commonly, but not necessarily, implement the same ISA.

System memory 1320 may be configured to store instructions and data accessible by processor(s) 1310. In various embodiments, system memory 1320 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as a portion or all of one or more of the technologies, methods, systems, devices, and apparatuses as described herein, are shown stored within system memory 1320 as code 1325 and data 1326.

In one embodiment, I/O interface 1330 may be configured to coordinate I/O traffic between processor 1310, system memory 1320, and any peripheral devices in the device, including network interface 1340 or other peripheral interfaces. In some embodiments, I/O interface 1330 may perform any necessary protocol, timing or other data transformations to convert data signals from one component (e.g., system memory 1320) into a format suitable for use by another component (e.g., processor 1310). In some embodiments, I/O interface 1330 may include support for devices attached through various types of peripheral buses, such as a variant of the Peripheral Component Interconnect (PCI) bus standard or the Universal Serial Bus (USB) standard, for example. In some embodiments, the function of I/O interface 1330 may be split into two or more separate components, such as a north bridge and a south bridge, for example. Also, in some embodiments some or all of the functionality of I/O interface 1330, such as an interface to system memory 1320, may be incorporated directly into processor 1310.

Network interface 1340 may be configured to allow data to be exchanged between computer system 1300 and other devices 1360 attached to a network or networks 1350, such as other computer systems, components, processor units, or devices as illustrated in FIGS. 1 through 12, for example. In various embodiments, network interface 1340 may support communication via any suitable wired or wireless general data networks, such as types of Ethernet network, for example. Additionally, network interface 1340 may support communication via telecommunications/telephony networks such as analog voice networks or digital fiber communications networks, via storage area networks such as Fibre Channel SANs, or via any other suitable type of network and/or protocol.

In some embodiments, system memory 1320 may be one embodiment of a computer-accessible medium configured to store program instructions and data for implementing embodiments of a portion or all of one or more of the technologies, methods, systems, devices, and apparatuses as described herein relative to FIGS. 1-12. In other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1300 via I/O interface 1330. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computer system 1300 as system memory 1320 or another type of memory. Further, a computer-accessible medium may include transmission media or signals such as electrical, electromagnetic, or digital signals, conveyed via a communication medium such as a network and/or a wireless link, such as may be implemented via network interface 1340.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

Although in the embodiments described above, some of the mobile device test modules, test module chassis, some combination thereof, etc. have been described as having at least one structural dimension, including height, which is 1U in length, modules, chassis, some combination thereof, etc. may in various embodiments include structural dimensions having a length of 2U, 3U, 4U, 5U or any other length.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system comprising:
two or more mobile device test modules, wherein each of the two or more mobile device test modules comprises:
an individual mobile device and
a distinct instance of processing circuitry communicatively coupled to the mobile device, and
wherein each of the two or more mobile device test modules is configured to enable testing of a respective mobile device program of instructions received from a remotely-located user via a communication network, on the respective individual mobile device via a respective device communication link established between the respective instance of processing circuitry and the respective individual mobile device; and
a test module chassis comprising two or more respective slot spaces each configured to receive respective ones of the two or more mobile device test modules into respective slot spaces to communicatively couple the respective instance of processing circuitry with the communication network;

wherein a respective instance of processing circuitry is configured to generate a command signal which, when communicated to the respective mobile device via the respective device communication link, causes the respective mobile device to execute the respective mobile device program of instructions, based at least in part upon a command received from the remotely-located user via the communication network.

2. The system of claim 1, wherein:
each of the two or more mobile device test modules comprises a respective communication connector interface communicatively coupled with the respective instance of processing circuitry; and
the test module chassis comprises a backplane that is communicatively coupled with the communication network and is configured to couple with respective ones of the communication connector interfaces of the two or more mobile device test modules received into the slot space to communicatively couple the respective instances of processing circuitry with the communication network.

3. The system of claim 2, wherein:
at least one mobile device test module of the two or more mobile device test modules comprises a set of communication connector interfaces, arranged in a particular arrangement, communicatively coupled with the at least one instance of processing circuitry;
the backplane comprises a corresponding set of communication connector interfaces, arranged in the particular arrangement, communicatively coupled with the communication network, wherein each communication connector interface of the corresponding set is configured to communicatively couple separate instances of processing circuitry, included in separate mobile device test modules received into the slot space of the test module chassis, to the communication network; and
the at least one mobile device test module is configured to couple, at the set of communication connector interfaces, with the corresponding set of network communication interfaces to establish a set of redundant communication links between the at least one instance of processing circuitry and the communication network.

4. An apparatus comprising:
two or more mobile device testing modules each configured to enable testing of a respective mobile device program received from a respective remotely-located user via a respective communication network, on a respective individual mobile device, wherein each of the mobile device testing module comprise:
a housing configured to receive and structurally support the respective individual mobile device within an interior of the housing; and
an instance of processing circuitry physically coupled to the interior of the housing and communicatively coupled to the communication network, the instance of processing circuitry configured to:
establish a device communication link with the respective individual mobile device structurally supported within the interior of the housing, and command the respective individual mobile device to execute the respective mobile device program;
wherein each of the mobile device testing modules are configured to restrict the respective instance of processing circuitry from establishing additional device communication links with additional individual mobile devices that are internal to the apparatus and external to the respective mobile device testing module.

5. The apparatus of claim 4, wherein:
to establish a device communication link with the individual mobile device structurally supported within an interior of the housing, the at least one instance of processing circuitry is configured to establish a wireless communication link with the individual mobile device.

6. The apparatus of claim 4, wherein:
to restrict the at least one instance of processing circuitry and the individual mobile device from establishing additional device communication links with additional individual mobile devices external to the mobile device testing module, the mobile device testing module comprises a housing which is configured to at least partially inhibit Radio Frequency (RF) electromagnetic radiation from passing between the interior of the housing and an exterior of the mobile device testing module.

7. The apparatus of claim 4, wherein:
the mobile device testing module is configured to enable testing of at least one mobile device program, received from a remotely-located user via a communication network, on the individual mobile device;
the at least one instance of processing circuitry is configured to command the mobile device to execute the at least one mobile device program based at least in part upon commands received from the remotely-located user via the communication network; and
the module device testing module comprises at least one connector interface, coupled to the housing, which is configured to communicatively couple the at least one instance of processing circuitry to an external power source and the communication network.

8. The apparatus of claim 7, wherein:
the at least one connector interface comprises at least one blind mate connector interface.

9. The apparatus of claim 7, wherein:
the at least one instance of processing circuitry comprises a physical connector which is configured to carry at least some electrical power received at the at least one instance of processing circuitry from the external power source and is further configured to be coupled with a power connector interface of the individual mobile device, such that the mobile device test module is configured to provide electrical power support to the individual mobile device via the physical connector.

10. The apparatus of claim 7, wherein:
the mobile device test module comprises a power connector, coupled to the at least one connector interface, which is configured to carry at least some electrical power received at the at least one connector interface from the external power source and is further configured to be physically coupled with a power connector interface of the individual mobile device, such that the mobile device test module is configured to provide electrical power support to the individual mobile device independently of the at least one instance of processing circuitry.

11. The apparatus of claim 4, wherein the mobile device test module comprises:
a set of mounting elements, coupled to the interior of the housing, which are configured to structurally stabilize the mobile device in a particular position within the interior of the housing.

12. The apparatus of claim 4, wherein the mobile device test module comprises one or more air passages configured to receive and direct air from an external source to remove heat from at least one of the individual mobile device or the at least one instance of processing circuitry.

13. The apparatus of claim 4, wherein the mobile device test module comprises:
   a mobile device testing interface, coupled to the interior of the housing, which comprises one or more of:
      a microactuator assembly configured to interact with one or more touch-sensitive user interfaces of the mobile device;
      a camera assembly configured to capture images of one or more display interfaces of the mobile device; or
      a positional adjustment assembly configured to adjust a physical position of the mobile device within the interior of the housing.

14. The apparatus of claim 4, wherein:
   the at least one instance of processing circuitry is configured to:
      establish a sideband communication link with the individual mobile device; and
      monitor one or more operational parameters of the mobile device, based at least in part upon communicating with one or more portions of the individual mobile device via the established sideband communication link.

15. A method, comprising:
   configuring each of two or more mobile device testing modules to enable testing of at least one mobile device program, received from a remotely-located user via a communication network, on respective mobile devices included in each respective module, wherein the configuring comprises:
      for each of the two or more mobile device testing modules:
         placing an individual mobile device in an interior of a housing, such that the individual mobile device is structurally supported within the interior of the housing;
         coupling a respective instance of processing circuitry to the interior of the housing, wherein the respective instance of processing circuitry is configured to be communicatively coupled with the communication network; and
         establishing a device communication link between the respective instance of processing circuitry and the individual mobile device, such that the respective of processing circuitry is configured to command the individual mobile device, via the device communication link, to execute the at least one mobile device program based at least in part upon commands received from the remotely-located user via the communication network;
         wherein the mobile device testing module is configured to restrict the respective instance of processing circuitry to establishing device communication links with the individual mobile device.

16. The method of claim 15, wherein:
   the established device communication link comprises a wireless communication link.

17. The method of claim 15, wherein the configuring comprises:
   installing each of the two or more mobile device test modules in a test module chassis, wherein the installing comprises:
      mounting the two or more mobile device test modules in respective slots of the test module chassis, such that the mobile device test modules are structurally supported by the test module chassis;
      coupling each of the two or more mobile device test modules to a chassis network switch device included in the test module chassis, such that the two or more instances of processing circuitry are communicatively coupled to the communication network via the chassis network switch device; and
      coupling each of the two or more mobile device test modules to a power source via one or more power transmission lines included in the test module chassis.

18. The method of claim 17, wherein:
   each of the two or more mobile device test modules comprise a communication connector interface which is coupled to respective instances of processing circuitry; and
   coupling each of the two or more mobile device test modules to the chassis network switch device included in the test module chassis comprises slidably inserting the respective mobile device test module into the respective slot of the test module chassis to couple the respective communication connector interface of the respective mobile device test module with a complementary communication connector interface of the test module chassis to communicatively couple the respective instance of processing circuitry with the communication network.

19. The method of claim 18, wherein:
   the test module chassis comprises a set of symmetrically-positioned communication connector interfaces within the slot of the test module chassis, wherein each communication connector interface is configured to communicatively couple a separate instance of processing circuitry, included in a separate mobile device test module mounted in the slot, to the communication network; and
   each of the two or more mobile device test modules comprises a set of symmetrically-positioned communication connector interfaces which are each coupled to the at least one instance of processing circuitry; and
   coupling each of the two or more mobile device test modules to the chassis network switch device included in the test module chassis comprises coupling the respective set of symmetrically-positioned communication connector interfaces of the respective mobile device test module with the respective set of symmetrically-positioned communication connector interfaces within the respective slot of the test module chassis to establish a set of redundant communication links between the respective instance of processing circuitry and the communication network.

20. The method of claim 15, wherein, to restrict the respective instance of processing circuitry to establishing device communication links with the individual mobile device, the respective mobile device testing module comprises a respective housing which is configured at least partially inhibit Radio Frequency (RF) electromagnetic radiation from passing between the interior of the housing and an exterior of the respective mobile device testing module.

* * * * *